US012631279B2

(12) United States Patent
    Jasper

(10) Patent No.: US 12,631,279 B2
(45) **Date of Patent: *May 19, 2026**

(54) WATER PROCESSOR

(71) Applicant: Rapid Water Technology LLC, Grand Rapids, MI (US)

(72) Inventor: Thomas E. Jasper, Grand Rapids, MI (US)

(73) Assignee: Rapid Water Technologies LLC, Grand Rapids, MI (US)

( * ) Notice: Subject to any disclaimer, the term of this patent is extended or adjusted under 35 U.S.C. 154(b) by 352 days.

This patent is subject to a terminal disclaimer.

(21) Appl. No.: 18/449,813

(22) Filed: Aug. 15, 2023

(65) Prior Publication Data

US 2023/0383887 A1    Nov. 30, 2023

Related U.S. Application Data

(63) Continuation of application No. 17/341,729, filed on Jun. 8, 2021, now Pat. No. 12,066,137.

(Continued)

(51) Int. Cl.
    *F16L 55/027* (2006.01)
    *C02F 1/00* (2023.01)
    (Continued)

(52) U.S. Cl.
    CPC ........ *F16L 55/02718* (2013.01); *C02F 1/006* (2013.01); *F15D 1/025* (2013.01);
    (Continued)

(58) Field of Classification Search
    CPC ..... F16L 55/02718; F16L 58/00; C02F 1/006; C02F 2307/14; F15D 1/025; F28F 19/01
    See application file for complete search history.

(56) References Cited

U.S. PATENT DOCUMENTS

| 4,609,471 A | 9/1986 | Beemster et al. |
| 5,753,106 A | 5/1998 | Schenck |

(Continued)

FOREIGN PATENT DOCUMENTS

| AU | 7048487 | 1/1987 |
| CA | 2888661 | 4/2015 |

(Continued)

OTHER PUBLICATIONS

International Search Report and Written Opinion of the International Searching Authority from corresponding Patent Cooperation Treaty (PCT) Patent Application No. PCT/IB21/55042, mailed Nov. 4, 2021.

(Continued)

*Primary Examiner* — David R Deal

(74) *Attorney, Agent, or Firm* — Gardner, Linn, Burkhart & Ondersma LLP

(57)    ABSTRACT

A water processor is provided for processing or conditioning water to be distributed downstream of the water processor. The water processor includes a housing having an inlet and an outlet opposite the inlet. The water processor includes a conditioning element disposed inside of the housing between the inlet and outlet. The conditioning element includes a plurality of plates having apertures with sharp edges to direct the flow of water and facilitate splitting of small gas bubbles into even smaller nano-bubbles. The plurality of plates include a first plate having a first configuration of apertures and a second plate having a second configuration of apertures. The first and second plates are disposed in alternating spaced arrangement along the longitudinal axis of the housing. The second configuration is different from the first configuration such that the flow path through the water processor is circuitous or substantially indirect.

17 Claims, 14 Drawing Sheets

Related U.S. Application Data

(60) Provisional application No. 63/036,786, filed on Jun. 9, 2020.

(51) Int. Cl.
  F15D 1/02 (2006.01)
  F16L 58/00 (2006.01)
  F28F 19/01 (2006.01)

(52) U.S. Cl.
  CPC .............. *F16L 58/00* (2013.01); *F28F 19/01* (2013.01); *C02F 2307/14* (2013.01)

(56) References Cited

U.S. PATENT DOCUMENTS

| | | | |
|---|---|---|---|
| 6,892,805 | B1 | 5/2005 | Valensa |
| 6,989,095 | B2 | 1/2006 | Melton et al. |
| 7,547,413 | B2 | 6/2009 | Bauer |
| 7,906,025 | B2 | 3/2011 | Bauer |
| 8,307,943 | B2 | 11/2012 | Klasing et al. |
| 8,317,165 | B2 | 11/2012 | Yamasaki et al. |
| 8,356,633 | B2 | 1/2013 | Hasimoto et al. |
| 8,454,837 | B2 | 6/2013 | Bauer |
| 8,740,450 | B2 | 6/2014 | Mogami et al. |
| 9,114,414 | B2 | 8/2015 | Stein et al. |
| 9,200,650 | B2 | 12/2015 | Van Buskirk |
| 9,381,694 | B2 | 7/2016 | Kanai et al. |
| 9,624,748 | B2 | 4/2017 | Gnanavelu et al. |
| 9,677,687 | B2 | 6/2017 | Yli-Koski et al. |
| 10,246,354 | B2 | 4/2019 | Xiao |
| 10,308,904 | B2 | 6/2019 | Beene, Jr. |
| 10,480,668 | B2 | 11/2019 | Baxter |
| 10,704,574 | B2 | 7/2020 | Liang et al. |
| 10,718,252 | B2 | 7/2020 | Im |
| 10,933,388 | B1 | 3/2021 | Falcone |
| 11,097,961 | B1 | 8/2021 | Jones |
| 12,066,137 | B2 * | 8/2024 | Jasper ..................... F28F 19/01 |
| 2002/0014400 | A1 | 2/2002 | Zadiraka et al. |
| 2002/0066970 | A1 | 6/2002 | Speece |
| 2003/0155297 | A1 | 8/2003 | Kellgren |
| 2007/0228584 | A1 | 10/2007 | Hills |
| 2009/0178968 | A1 | 7/2009 | Cummins |
| 2010/0089133 | A1 | 4/2010 | Yamasaki et al. |
| 2010/0102003 | A1 | 4/2010 | Holland |
| 2011/0000860 | A1 | 1/2011 | Bland et al. |
| 2012/0006615 | A1 | 1/2012 | Klasing et al. |
| 2013/0008857 | A1 | 1/2013 | Foster |
| 2016/0236158 | A1 | 8/2016 | Bauer |
| 2017/0056846 | A1 | 3/2017 | Yu et al. |
| 2018/0058764 | A1 | 3/2018 | Hong et al. |
| 2021/0299616 | A1 | 9/2021 | Titus |

FOREIGN PATENT DOCUMENTS

| | | |
|---|---|---|
| CN | 201458797 | 5/2010 |
| CN | 110436571 | 11/2019 |
| CN | 110508589 | 11/2019 |
| KR | 20110134085 | 12/2011 |
| WO | WO9519504 | 7/1995 |
| WO | 2009/123749 | 10/2009 |
| WO | 2015/048904 | 4/2015 |
| WO | 2016/168943 | 10/2016 |

OTHER PUBLICATIONS

Office Action in commonly-owned U.S. Appl. No. 17/522,223, dated May 25, 2023.
Office Action in commonly-owned U.S. Appl. No. 17/341,729, dated Jan. 20, 2023.
Office Action in commonly-owned U.S. Appl. No. 17/341,729, dated Jun. 9, 2023.

* cited by examiner

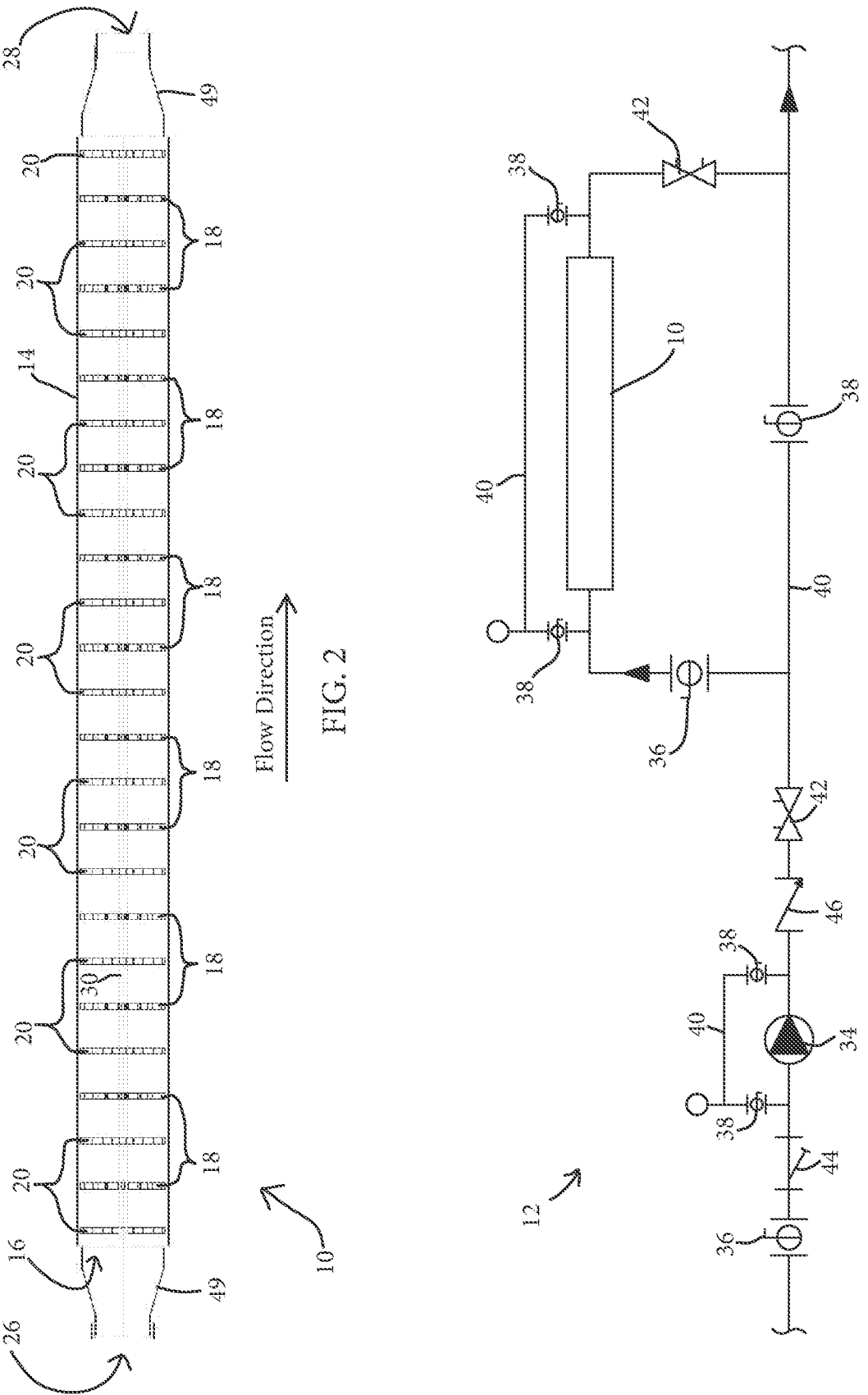

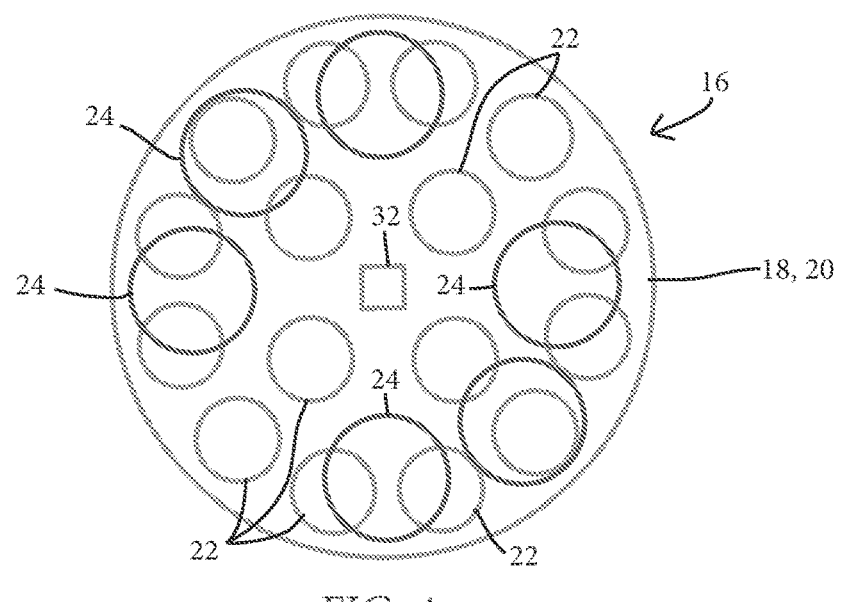
FIG. 4
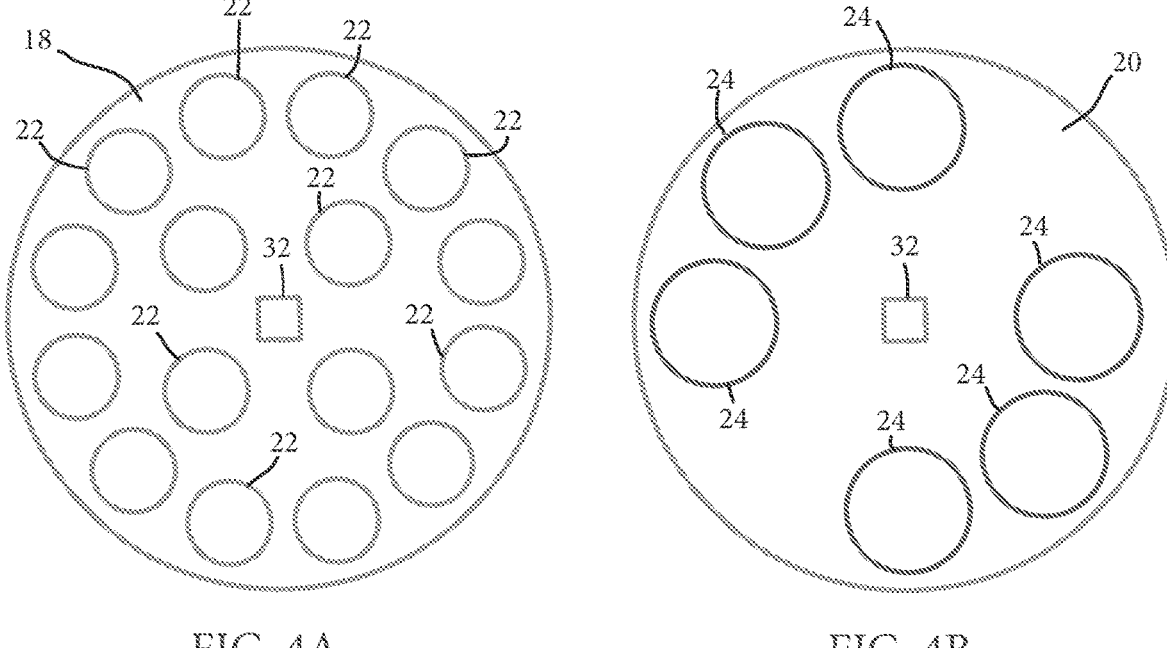
FIG. 4A                    FIG. 4B

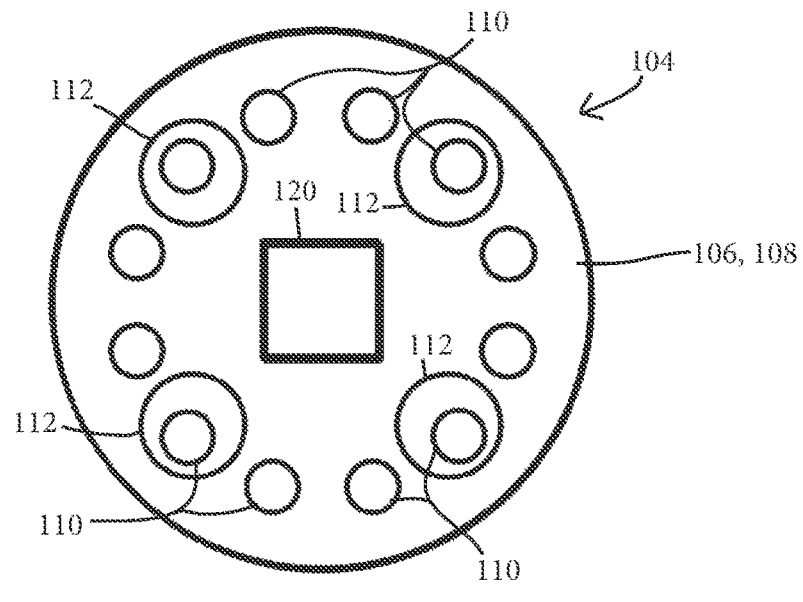
FIG. 7
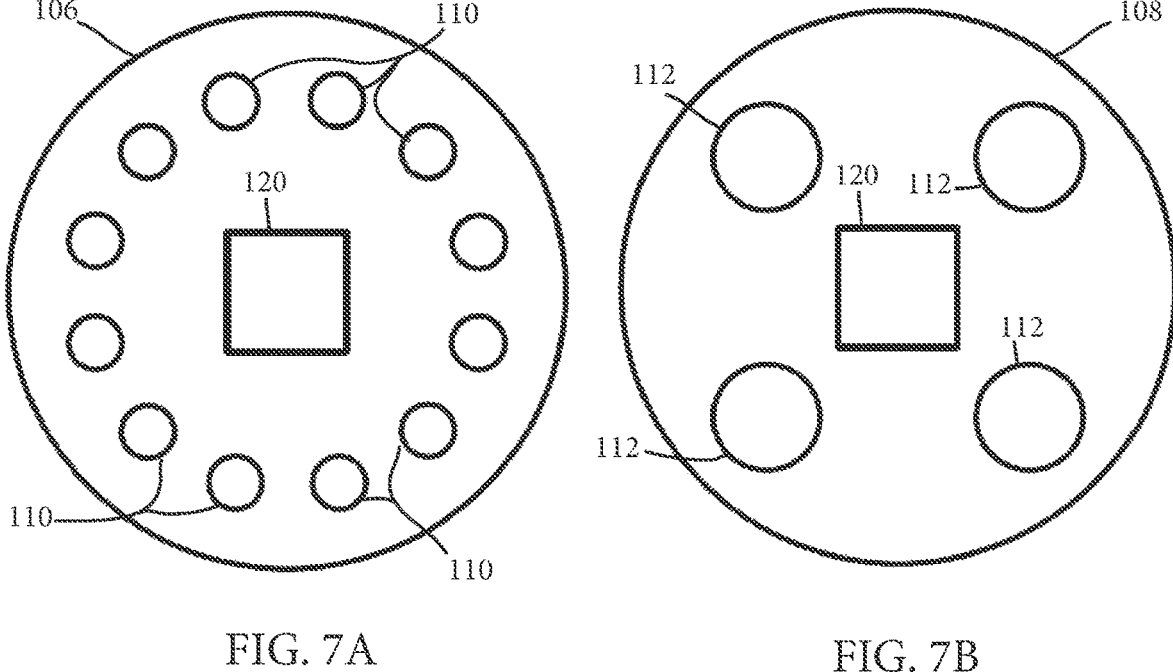
FIG. 7A                                    FIG. 7B

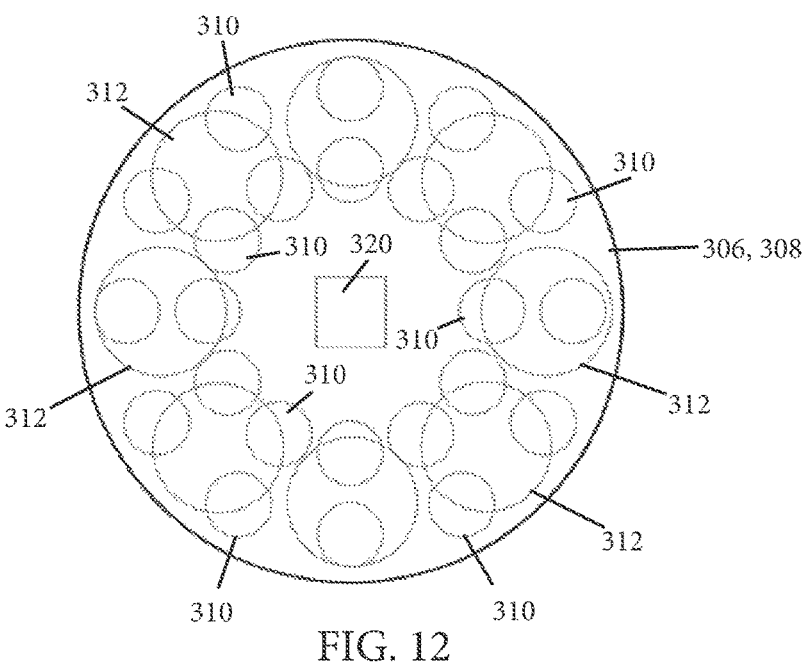
FIG. 12
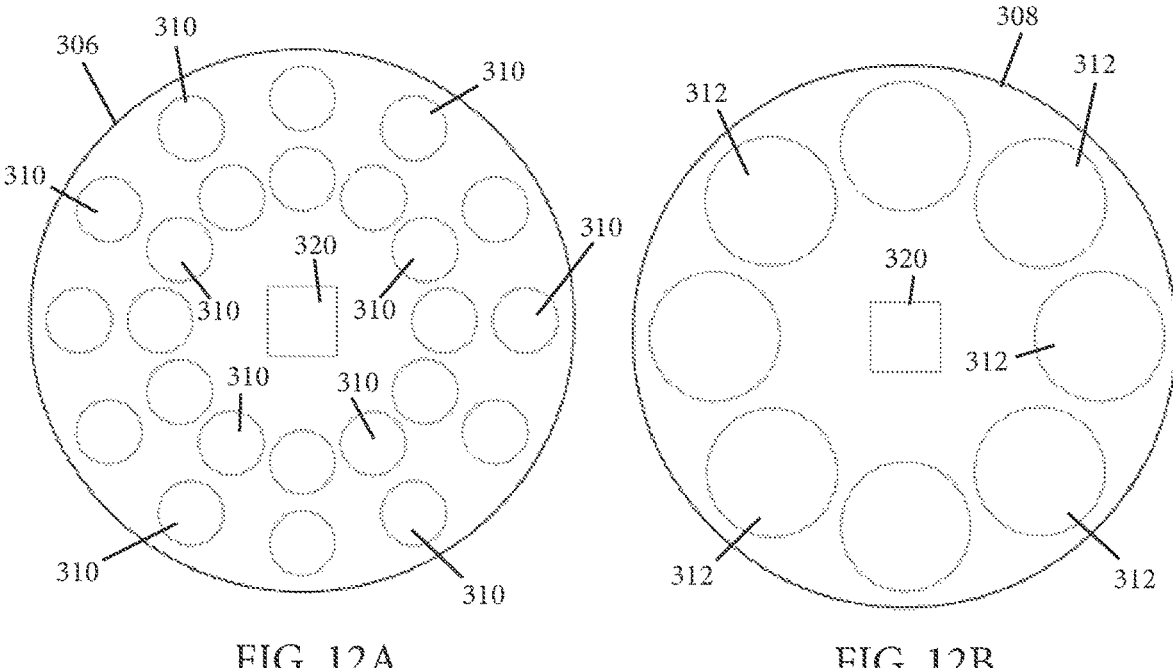
FIG. 12A                    FIG. 12B

WATER PROCESSOR

CROSS REFERENCE TO RELATED APPLICATIONS

The present application is a continuation of U.S. patent application Ser. No. 17/341,729, filed Jun. 8, 2021, now U.S. Pat. No. 12,066,137, which claims the priority of U.S. provisional application Ser. No. 63/036,786, filed Jun. 9, 2020, both of which are hereby incorporated herein by reference in their entireties.

FIELD OF THE INVENTION

The present invention is directed to apparatus and methods for processing or conditioning of water.

BACKGROUND OF THE INVENTION

Water passing through water distribution or circulation systems commonly includes organic materials, microorganisms, and minerals that can produce biofilms and scale deposits on surfaces of processing equipment or components of the water distribution system, such as interior pipe walls and heating exchanger elements. Biofilm is a layer of microorganisms contained in a slime layer, which forms on surfaces in contact with water. Scale deposits or scaling occurs in the boundary layer between the water and the inside surface of the pipe or equipment surface. Processing or conditioning of water can be affected by reducing, neutralizing, or eliminating the organic materials, and minerals in the water that will pass through the water system. Scale, slime, or biofilm layers produce a boundary layer between the water and the equipment, which may render the equipment and components less effective or wholly ineffective, requiring out-of-service time and costs for cleaning or replacement. Other effects of biofilms and scaling may include reduced heat transfer between the water and the piping, increased fluid friction and reduced flow rates, increased energy and maintenance costs, increased chemical treatment costs, reduced equipment life, and undesirable odors.

SUMMARY OF THE INVENTION

The present invention provides a water processor or processing apparatus for processing or conditioning water to reduce or neutralize organic materials, such as microorganisms and other biological contaminants, as well as inorganic material which may be present in a water distribution or circulation system. Reducing or neutralizing the organic and inorganic materials reduces the likelihood of biofilms and scale building-up on the inner walls of pipes or surfaces of components in a downstream water system. The water processor includes a conditioning element having alternating conditioning plates or discs with different patterns or configurations of flow-directing apertures. The alternating flow-directing apertures force the water to flow in a staggered, circuitous or substantially indirect fashion through the water processor, which creates turbulence and shear in the water flow. The turbulence and shear facilitate interaction of the water molecules and suspended gas bubbles in the water with the conditioning plates. The plate apertures include a sharp edge configuration. The sharp aperture edges and aperture configurations impart turbulence and shear in the water flow and facilitate the division of larger gas bubbles into smaller nano-bubbles. A nano-bubble has a diameter well under 1 millimeter (1 mm), such as about fifty to two-hundred nanometers (50-200 nm). The nano-bubbles created by the water processor are effective in reducing organic materials, microorganisms, and biological contaminants present in water, such as potable water or water used in industrial equipment, residential or commercial water systems, clean-in-place (CIP) systems, process cooling systems, swimming pools, hot tubs, spas, ponds, water features, and the like. Nano-bubbles may aid in precipitating solids suspended in the water, so that the precipitated solids may be removed from the water via filtration or settling. The water processor produces or forms nano-bubbles in the water and the nano-bubbles condition or treat the components throughout the water system in which the processor is installed.

According to one form of the present invention, a water processor is provided for processing or conditioning water to be distributed or circulated downstream of the water processor. The water processor includes a housing having an inlet at one end and an outlet at the opposite end. The water processor includes a conditioning element disposed inside of the housing between the inlet and the outlet. The conditioning element includes a plurality of conditioning element plates or discs that process the water and direct the flow of water through the water processor. The plurality of plates include first plates having a first pattern or configuration and second plates having a second pattern or configuration. The first and second plates are disposed in alternating spaced arrangement inside of and along the longitudinal axis of the housing such that the first configuration and second configuration alternate one after the other. The first plates each define a plurality of flow-directing apertures therethrough, wherein the pattern or arrangement of apertures defines the first configuration. The second plates each define a plurality of flow-directing apertures therethrough, wherein the pattern or arrangement of apertures defines the second configuration. The second configuration is different from the first configuration such that the flow path through the water processor is staggered, circuitous or indirect. The flow-directing apertures in the first and second plates include sharp edges that facilitate division or splitting of large gas bubbles suspended in the water into smaller gas bubbles, down to the nano-bubble size. Preferably, the sharpness of the edge of each aperture is as sharp as a knife or razor edge, e.g. having a radius of about 0.01 microns or less.

In one aspect, the total opening surface area of each of the first plates is different than the total opening surface area of each of the second plates, thereby causing changes in water flow speed past the first and second plates, while maintaining a consistent flow rate past each of the plates. For example, the first configuration of flow-directing apertures of each of the first plates may have a total opening surface area that is different than the total opening surface area of the second configuration of flow-directing apertures of each of the second plates, so that the water flow speed past the first plates is slower than the water flow speed past the second plates for any given flow rate. Optionally, a center-to-center spacing of adjacent ones of the apertures of the first plate may be different than a center-to-center spacing of adjacent ones of the apertures of the second plate. Further optionally, the first configuration of apertures of the first plate and/or the second configuration of apertures of the second plate may include at least two differently sized apertures.

In another aspect, the first configuration of apertures of the first plate and/or the second configuration of apertures of the second plate includes two non-contiguous groupings of flow-directing apertures spaced uniformly about the plate. Each of the groupings are mirrored across from the other grouping across a diametral axis of the plate. For example, the second configuration of apertures of the second plate may include two non-contiguous groupings of three flow-directing apertures spaced uniformly and circumferentially near an outer perimeter of the second plate. Each of the groupings of three apertures are mirrored across from the other grouping across a diametral axis of the second plate.

In another aspect, the first configuration of apertures of the first plate and/or the second configuration of apertures of the second plate includes two or more rings of uniformly and circumferentially spaced flow-directing apertures, with each ring of apertures having a different diameter. The number of apertures of each ring may be different from the other ring(s). For example, each first plate may include an outer ring of twelve (12) flow-directing apertures spaced circumferentially near an outer perimeter of the first plate. The first plate further includes an inner ring of four flow-directing apertures spaced circumferentially near a center of the first plate and inside of the outer ring of twelve (12) apertures.

In yet another aspect, the fluid flow passing through the water processor passes sequentially over each of the alternating first plates and the second plates. Optionally, the conditioning element may include more first plates than second plates. For example, the conditioning element may include twelve (12) of the first plates and thirteen (13) of the second plates in alternating spaced arrangement.

In still another aspect, the first plates and the second plates are fixedly coupled to an elongate rod which is disposed coaxially with the longitudinal axis of the housing.

Optionally, the first plate and second plates are circular metal plates having a thickness of between about one-eighth inch to about one-half inch (0.125-0.5 in.), and preferably of about one-quarter inch (0.25 in.), and may be formed of 316 stainless steel or other relatively inert metal or metal alloy. Preferably, the spacing between immediately adjacent ones of the first and second plates is between about one-half inch to about four inches (0.5-4.0 in.)

In still another aspect, each of the flow-directing apertures of each of the first plates may be co-axial with a corresponding flow-directing aperture of the other of the first plates of the conditioning element. Optionally, none of the flow-directing apertures of the second plates are co-axial with any of the flow directing apertures of any of the first plates.

In another form of the present invention, a water processor includes a housing having an inlet at one end and an outlet at the opposite end. The water processor includes a conditioning element disposed inside of the housing between the inlet and the outlet. The conditioning element includes a plurality of conditioning element plates or discs that process the water and direct the flow of water through the water processor. The plurality of plates each define a plurality of flow-directing apertures therethrough, defining an aperture configuration. The aperture configuration of each plate may be identical to or different from the other plates. The plates may be disposed in the housing in non-uniform orientation such that the apertures of each plate are not necessarily aligned or co-axial with one another, from one plate to the next. The non-uniform arrangement of the plate aperture configurations create a flow path through the water processor that is staggered, circuitous or indirect. The flow-directing apertures in the plates include sharp edges that facilitate dividing or splitting of large gas bubbles suspended in the water into smaller gas bubbles, down to the nano-bubble size. A nano-bubble is defined as a gas bubble having a diameter of less than about one micrometer (1 µm), and preferably less than about two-hundred nanometers (200 nm).

In yet another form of the present invention, a water conditioning assembly includes a plurality of first flow directing or conditioning element plates or discs with flow directing apertures similar to the first plates described above, a plurality of second flow directing or conditioning element plates or discs with flow directing apertures similar to the second plates described above, and an elongate supporting rod at which the first plates and second plates are fixedly coupled in a spaced arrangement. Optionally, the water conditioning assembly may be installed in a housing that is configured to be installed in-line between two water transport conduits of a water distribution system. However, it will be appreciated that the water conditioning assembly may be installed directly into a water transport conduit (e.g. a cylindrical or tubular pipe), in-line with the water flow through the conduit, to provide a desired amount of nano-bubble water processing within the conduit.

Accordingly, the present invention provides a water processor for forming nano-bubbles in a water flow, the nano-bubbles facilitating reduction of organic materials present in water for distribution downstream of the processor. The water processor provides a staggered, circuitous, or indirect flow path which, combined with sharp aperture edges, creates turbulent and shear flow inside of the processor. The turbulence and shear facilitates sufficient interaction between the water passing through the processor and the conditioning element to divide large gas bubbles into smaller nano-bubbles. When water laden with large gas bubbles is forced past the plates through the apertures under pressure, the larger bubbles contacting the aperture edges are divided or split into smaller bubbles, making the water laden or more saturated with nano-bubbles. The water processor may optionally be used for imparting desirable characteristics to potable drinking water, to water used in household or commercial plumbing and HVAC systems, to water used in industrial machinery or processes, to water used in clean-in-place (CIP) systems, to water used in process cooling systems, to water used in swimming pools, hot tubs, and spas, to water used in ponds and water features, for example.

These and other objects, advantages, purposes and features of this invention will become apparent upon review of the following specification in conjunction with the drawings.

BRIEF DESCRIPTION OF THE DRAWINGS

FIG. 2 is a sectional plan view of the water processor of FIG. 1;

FIG. 3 is a schematic diagram of an exemplary water distribution system including the water processor of FIG. 1;

FIG. 4 is a plan view of a water conditioning element of the water processor of FIG. 1, depicting two superimposed conditioning element plates and relative positioning of flow-directing apertures of the respective plates;

FIG. 4A is a plan view of one of the conditioning element plates of FIG. 4;

FIG. 4B is a plan view of the other conditioning element plate of FIG. 4;

FIG. 7 is a plan view of a water conditioning element of the water processor of FIG. 5, depicting two superimposed conditioning element plates and relative positioning of flow-directing apertures of the respective plates;

FIG. 7A is a plan view of one of the conditioning element plates of FIG. 7;

FIG. 7B is a plan view of the other conditioning element plate of FIG. 7;

FIG. 12 is a plan view of a water conditioning element of the water processor of FIG. 10, depicting two superimposed conditioning element plates and relative positioning of flow-directing apertures of the respective plates;

FIG. 12A is a plan view of one of the conditioning element plates of FIG. 12;

FIG. 12B is a plan view of the other conditioning element plate of FIG. 12;

DESCRIPTION OF THE PREFERRED EMBODIMENTS

Figure 1:
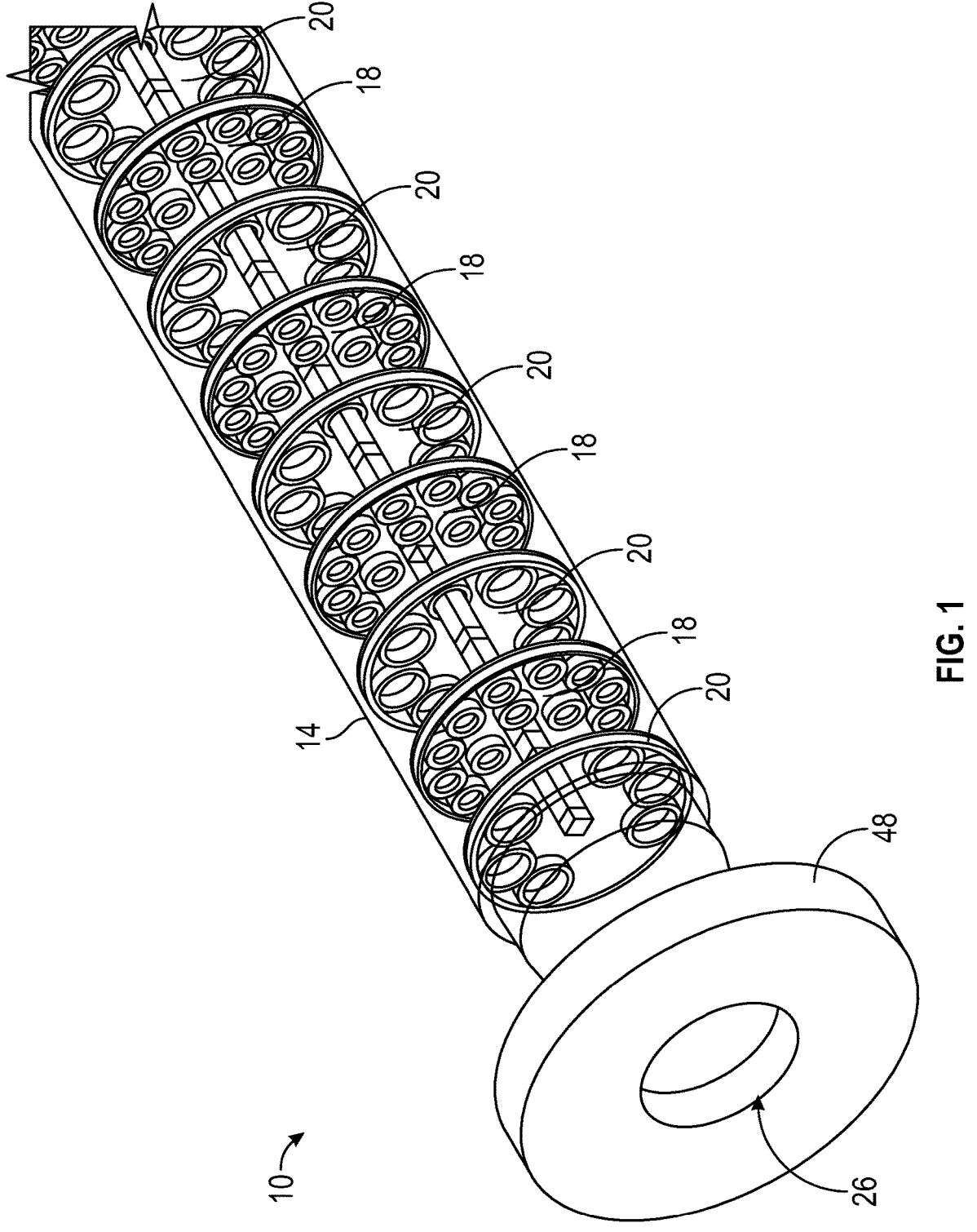
FIG. 1 is a perspective view of a portion of a water processor in accordance with the present invention, the water processor depicted in phantom to show internal structure.
Figure 19:
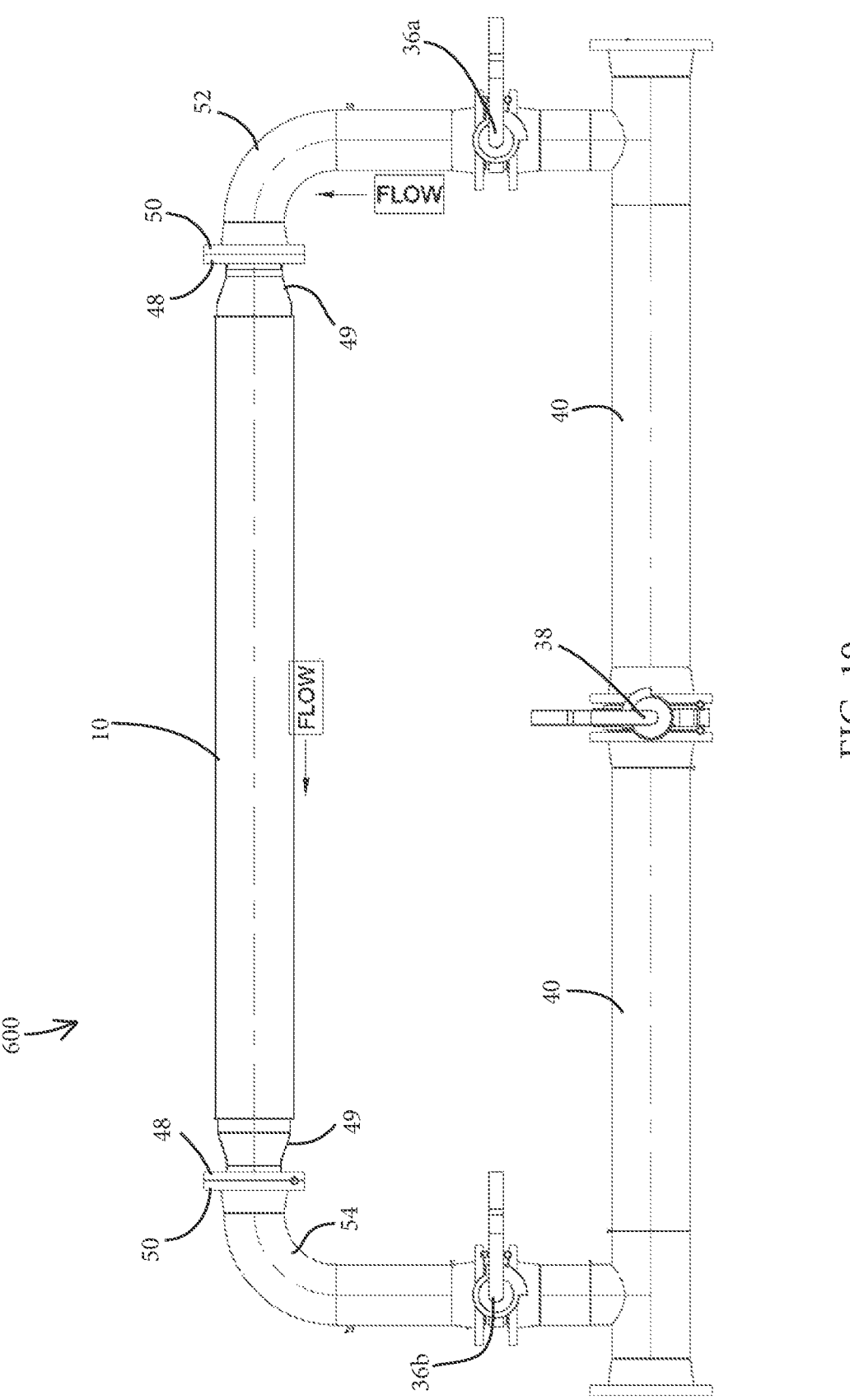
FIG. 19 is a schematic diagram of an exemplary selectively bypassable branch of a water distribution system, including the water processor of FIG. 1.

Referring now to the drawings and the illustrative embodiments depicted therein, a water processor or conditioner 10 (FIG. 1) is provided for processing or conditioning water passing through a water system, such as exemplary single-pass water distribution system 12 (FIG. 3) or exemplary selectively bypassable branch 600 of a water distribution system (FIG. 19). Optionally, the water processor may be implemented in a closed water-circulating system, such as a re-circulating type heating system. The water processor 10 includes a housing 14 and a water processing or conditioning element 16 disposed inside the housing 14 along the longitudinal axis of the housing 14. The water conditioning element 16 includes a plurality of water conditioning element plates or discs, including a first water conditioning element plate or disc 18 and a second water conditioning element plate or disc 20. The plates 18 and 20 have different aperture patterns or configurations, wherein the first plate 18 has a first pattern or configuration of apertures 22 and the second plate 20 has a second pattern or configuration of apertures 24 that is different from the first pattern or configuration. The different configurations of apertures 22 and 24 direct the flow of water through the water processor 10 and ensure adequate shear and/or turbulence of the water flow across the plates. The apertures of plates 18 and 20 have sharp edges that facilitate dividing or splitting of suspended gas bubbles into smaller bubbles, down to a nano-bubble size of much less than one millimeter (1 mm), preferably less than about one micrometer (1 μm), and more preferably less than about two-hundred nanometers (200 nm), referred to hereinafter as "nano-bubbles". The nano-bubble laden water treats or conditions the components of the water distribution or circulating system in which the water processor 10 is installed.

The water processor 10 is particularly useful for the reduction or neutralization of biofilm-producing organic materials and inorganic materials that are commonly present in water that passes through water processing systems, such as the exemplary water distribution system 12. The reduced sized nano-bubbles facilitate removal or reduction of microorganisms, organic materials, biological contaminants, and scaling minerals in the water. It will be appreciated that additional water conditioning functions may be performed by the water processor 10, such as reducing soluble salts or minerals in the water via ionization or other processes. Further, the water processor 10 may be used in combination with filtration systems or other water treatment devices, such devices including carbon cartridge (e.g. sediment) separators and/or UV light sterilization systems.

The housing 14 of water processor 10 may be configured similar to that of the water conditioner disclosed in expired Australian Patent AU-B-70484/87, filed Mar. 19, 1987, the disclosure of which is hereby incorporated herein by reference in its entirety. The housing 14 includes an inlet 26 at one end and an outlet 28 at the opposite end (FIG. 2). In the illustrated embodiment, the housing 14 is formed of a cylindrical or tubular pipe of fluid transport conduit having an interior diameter of about three and one-quarter inches (3.25 in.), however, it will be appreciated that other embodiments of the water processor 10 may utilize various diameters of tubular pipe to form the housing. The diameters of the inlet 26 and outlet 28 are smaller than the diameter of the main body of the housing 14, as shown in FIG. 2. However, it will be appreciated that the inlet 26 and outlet 28 diameters may be equal to or larger than the diameter of the main body of the housing 14, as desired to effect an optimal flow rate of water passing through the processor 10. Optionally, the housing 14 of the water processor may be omitted and the plates 18 and 20 disposed directly inside of a water transport conduit of a water distribution system without substantially affecting the functionality and efficiency of the water processor.

The conditioning element 16 is disposed on the interior of the housing 14 between the inlet 26 and the outlet 28. In the illustrated embodiment of FIG. 2, the conditioning element 16 includes six first plates 18 and six second plates 20 positioned in alternating spaced arrangement. However, the number of first plates 18 and second plates 20 may be chosen in a variety of quantities and arrangements. For example, the conditioning element 16 may include twelve (12) first plates 18 and thirteen (13) second plates 20 positioned in alternating spaced arrangement with a first plate 18 positioned closest to each end of the conditioning element 16.

The first plates 18 and the second plates 20 are fixedly disposed in alternating spaced arrangement along an elongate bar or rod 30 (FIG. 2). The rod 30 is substantially coaxial with the longitudinal axis of the housing 14. Each plate 18 and 20 includes a center aperture 32 configured to receive the rod 30 (FIGS. 4-4B). In the illustrated embodiments of FIGS. 4-43B, the center aperture 32 is defined by a square hole through the center of each plate 18 and 20. The square hole 32 is sized and shaped to receive the rod 30 having a square cross-section dimensioned similarly to square hole 32. During assembly of the water processor 10, the plates 18 and 20 are fixed to the rod 30 to form a unitary assembly of the conditioning element 16 such that the entire conditioning element 16 may be inserted into the housing 14 pre-assembled, prior to attachment of an end piece including the inlet 26 or the outlet 28. In one exemplary embodiment, the plates 18 and 20 may be spaced at uniform intervals of up to about four inches (4 in.) along the rod 30. It will be appreciated that larger spacing intervals may be advantageous depending on the flow rate, water pressure, and conduit inner diameter of the water processor.

The thickness of the plates 18 or 20 used in the processor 10 may factor into the optimal plate spacing for the processor. For example, in a water processor in which the plates are about one quarter of an inch (0.25 in.) thick, the plate spacing may be most optimal at about one to one and a half inches (1.0-1.5 in.). The diameter of housing 14, the number of plates 18 and 20, the longitudinal spacing of plates 18 and 20, the aperture configuration of each plate 18 and 20, and the cross-sectional area and edge sharpness of each aperture 22 and 24 may be chosen as a function of a desired flow rate and pressure required for the water system. An exemplary flow rate and pressure drop for the water processor 10 may be about three and one-half pounds per square inch (3.5 psi) pressure drop, along the full length of water processor 10, at about fifty gallons per minute (50 gpm) flow rate.

As illustrated in FIGS. 4-4B, the first and second configurations of apertures 22 and 24 of respective first and second plates 18 and 20 are different from each other. In the illustrated embodiment of FIGS. 4 and 4A, the apertures 22 of first plate 18 include a total of sixteen apertures 22 positioned in an outer ring of twelve (12) uniformly, contiguously, and circumferentially-spaced apertures and an inner ring of four (4) uniformly, contiguously, and circumferentially-spaced apertures 22. In the illustrated embodiment of FIGS. 4 and 4B, the apertures 24 of second plate 20 include a total of six apertures positioned in two (2) non-contiguous groups of three (3) uniformly spaced apertures. Each group of three apertures of the second plate 20 is non-contiguous with respect to the other group of three apertures as there is a discontinuation or large interval in the spacing between the two groups. Conversely, the outer ring of apertures and inner ring of apertures of first plate 18 may each be referred to as contiguous because there are no discontinuations in their uniform spacing. Adjacent apertures 22 of the outer ring of twelve apertures of first plates 18 have a different center-to-center spacing compared to the center-to-center spacing of adjacent ones of apertures 24 of second plates 20. The apertures 22 and 24 are typically cut perpendicularly to the planar faces of each plate. The perimeters of the plates 18 and 20 and the apertures 22 and 24 of each plate may be formed by waterjet cutting or laser cutting, which results in a small-radiused sharp edge defining the inlet-side and outlet-side edges of the plates and each aperture. Preferably, the sharpness of the apertures 22 and 24 is as sharp as a knife or razor edge, with a radius of about 0.01 microns or less, and more preferably the edge sharpness is as sharp as attainable through known machining and cutting techniques.

In one exemplary embodiment, the apertures 22 of first plate 18 each have a diameter of approximately one-half inch (0.5 in.), and the first plate 18 has a thickness of one-quarter inch (0.25 in.) and a diameter of $3\frac{7}{32}$ inch (3.218 in.), which is about the same as or slightly smaller than the inner diameter of the housing 14. In another exemplary embodiment, the apertures 24 of second plate 20 each have a diameter of approximately three-quarter inch (0.75 in.), and the second plate 20 has a thickness of about one-quarter inch (0.25 in.) and a diameter of $3\frac{7}{32}$ inch (3.218 in.), which is about the same as or slightly smaller than the inner diameter of the housing 14. The dimensioning of the first and second plates 18, 20 to match the inner diameter of the housing 14 results in most of the water being forced through the first and second apertures 22, 24, although at least a small amount of water may be forced between a gap formed between an outer edge of a given plate 18, 20 and the inner surface of the housing 14. As such, the outer edge of the plates 18 and 20 may further impart nano-bubbles into the water flowing through the processer 10.

In reference to this exemplary embodiment, it will be appreciated that the sixteen total first apertures 22, each having one-half inch (0.5 in.) diameter, have somewhat greater total opening surface area (about 3.14 in$^2$) as compared to the six total second apertures 24, each having three-quarter inch (0.75 in.) diameter (about 2.65 in$^2$). As a result, the speed of water flow through the second plate 20 must be greater than the speed of water flow through the first plate 18, by about 18%, to maintain constant flow rates across the first and second plates 18, 20. However, it will be appreciated that the apertures in each plate may be sized and numbered so as to have equal total opening surface areas and, therefore, equal flow speeds through each plate. Optionally, the aperture configurations of all plates in the conditioning element 16 may be the same (e.g. as shown in FIG. 4A) or the aperture configurations of each plate in the conditioning element 16 may be different than the aperture configuration of all the other plates, as desired.

The water flow speed may be determined and provided as a function of the system in which the processor 10 is disposed. The percentage of larger gas bubbles in a water flow that are split or divided into nano-bubbles may be increased or decreased as a function of the water flow speed passing through the processor 10. For example, in re-circulating systems, such as a boiler heating system, the water continuously passes through the processor and will, over time, become more fully saturated with nano-bubbles, and as a result the flow speed need not necessarily be optimized. Conversely, in single-pass water distribution systems in which water passes through the processor 10 only a single time (e.g. water distribution system 12 of FIG. 3), the water flow speed is preferably optimized to ensure sufficient saturation of nano-bubbles in the water distributed downstream of the processor 10.

In the illustrated embodiment, the positioning of the two aperture groups are mirrored across a diametral axis of the plate 20 (FIG. 4B). The apertures 24 of plate 20 are larger in diameter than apertures 22 of plate 18, and as noted above, apertures 24 of second plates 20 have different center-to-center spacing as compared to the outer ring of apertures 22 of first plates 18. Accordingly, as best shown in FIG. 4, when the plates 18 and 20 are disposed in alternating spaced arrangement along the rod 30, the apertures 22 of first plates 18 are not coaxially aligned with the apertures 24 of second plates 20, thus forming a staggered, circuitous, or substantially indirect flow path along which the water passes through the water processor 10. By imparting a circuitous flow path, the water flow has little to no direct path through the processor, causing the flow to be turbulent, which thereby causes the water and gas bubbles passing through the water processor 10 to mix and shear across the plate edges defining the apertures. The mixing of the water facilitates contact of the gas bubbles with the aperture edges of the plates 18 and 20, thereby effectuating sufficient division of larger gas bubbles into nano-bubbles.

The first plates 18 are symmetrical about all four quadrants of the circumference of the plate. As such, the apertures 22 of each first plate 18 are co-axial with the corresponding apertures 22 of the other first plates 18, regardless of the rotational orientation of each first plate 18 when the plates are disposed on the square rod 30. The configuration of apertures 24 of the second plates 20 may be offset by ninety degrees relative to the other second plates 20 when the plates 20 are disposed on the square rod 30. For example, one of the second plates 20 may be rotated ninety degrees relative to another second plate such that the center aperture of each group of three apertures is not co-axial with an aperture 24 on the other second plate 20.

The exemplary water system 12 of FIG. 3 is illustrative of how the water processor 10 may be utilized in a water treatment or distribution process. The water system 12 includes a series or network of water transport conduits or lines (e.g. cylindrical or tubular pipes), a water processor 10 installed in-line with one of the water conduits, and a pump 34 to pressurize and force water through the water processor 10. A plurality of shutoff valves 36 are provided in the system 12 to selectively disrupt the flow of water through the system 12. A plurality of bypass valves 38 and bypass water lines 40 are provided with the system to bypass the various components of the system 12, such as for maintenance of a particular component of the system 12. Additional components of the exemplary water system 12 include combination balancing/shut-off valves 42, strainers 44, and check valves 46, such as shown in FIG. 3.

The components of the water processor 10 may each be formed of a metal alloy which is inert and resistant to corrosion, such as 316 stainless steel, such that the main processor components do not chemically react or interact with the water passing through the water processor 10. Conversely, the components of the water processor 10 may be formed of different of metal alloys having different chemical characteristics to facilitate water processing and conditioning functions, such as ionizing or deionizing the water in the distribution system, for example.

The following provide additional exemplary embodiments for water processors in accordance with this disclosure. The following exemplary water processors, as illustrated in FIGS. 5-18B, are configured similarly and function in similar fashion to water processor 10 described above, with significant differences discussed hereinafter.

Figures 5, 6:
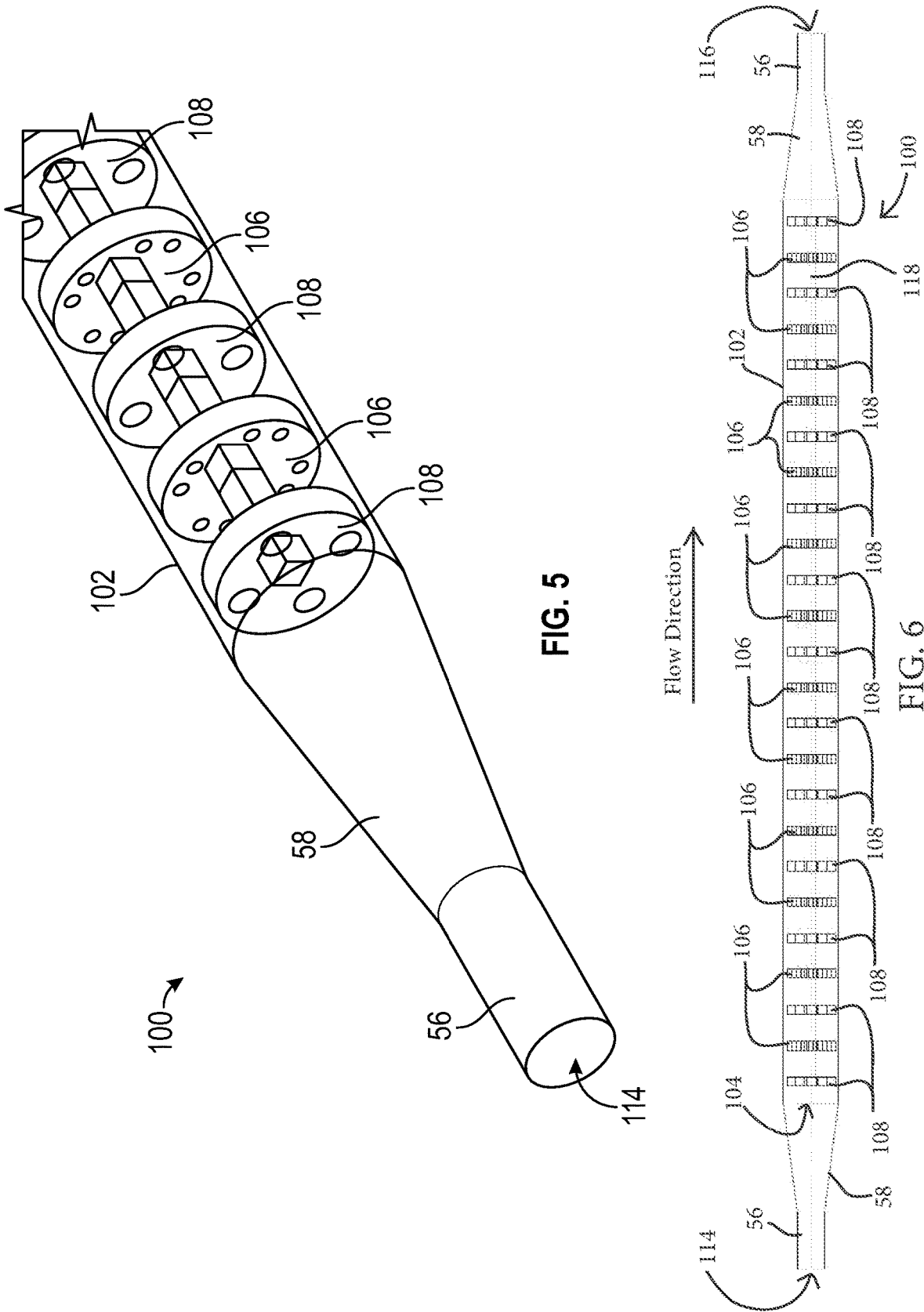
FIG. 5 is a perspective view of a portion of another water processor in accordance with the present invention, the water processor depicted in phantom to show internal structure.
FIG. 6 is a sectional plan view of the water processor of FIG. 5.

Referring now to the illustrative embodiment of FIGS. 5-7B, another water processor 100 is provided for processing or conditioning water passing through a water system. The water processor 100 includes a housing 102 and a water processing or conditioning element 104 disposed inside the housing 102 along the longitudinal axis of the housing 102. The water conditioning element 104 includes a plurality of first water conditioning element plates or discs 106 and a plurality of second water conditioning element plates or discs 108. The plates 106, 108 have different aperture patterns or configurations, wherein the first plate 106 has a first pattern or configuration of apertures 110 (FIGS. 7 and 7A) and the second plate 108 has a second pattern or configuration of apertures 112 (FIGS. 7 and 7B) that is different from the first pattern or configuration of apertures 110. The housing 102 includes an inlet 114 at one end and an outlet 116 at the opposite end (FIG. 6). In the illustrated embodiment, the housing 102 is formed of a cylindrical or tubular pipe of fluid transport conduit having an interior diameter of about 1.37 in. The plates 106 and 108 are fixedly disposed in alternating spaced arrangement along an elongate bar or rod 118 (FIG. 6). Each plate 106 and 108 includes a center aperture 120 configured to receive the rod 118 (FIGS. 7-7B).

In one exemplary embodiment, as illustrated in FIGS. 7-7B, the first plate 106 includes a total of twelve (12) uniformly, circumferentially-spaced apertures 110 and the second plate 108 includes a total of four (4) uniformly, circumferentially-spaced apertures 112. The apertures 110 of first plate 106 each have a diameter of approximately ⅛ inch (0.125 in.), and the apertures 112 of second plate 108 each have a diameter of approximately ¼ inch (0.25 in.). The plates 106 and 108 each have a thickness of ¼ inch (0.25 in.) and a diameter of about 1³⁄₁₀ inch (1.3 in.), which is about the same as or slightly smaller than the inner diameter of the housing 102. The apertures 112 of plate 108 are larger in diameter than apertures 110 of plate 106 and have different center-to-center spacing as compared to apertures 110 of first plates 106. Accordingly, as best shown in FIG. 7, when the plates 106 and 108 are disposed in alternating spaced arrangement along the rod 118, the apertures 110 of first plates 106 are not coaxially aligned with the apertures 112 of second plates 108, thus forming a staggered, circuitous, or substantially indirect flow path along which the water passes through the water processor 100.

In the illustrated embodiment, the first plates 106 and the second plates 108 are each symmetrical about all four quadrants of the circumference of the respective plate (FIGS. 7-7B). As such, the apertures 110 of each first plate 106 are co-axial with the corresponding apertures 110 of the other first plates 106 and the apertures 112 of each second plate 108 are co-axial with the corresponding apertures 112 of the other second plates 108, regardless of the rotational orientation of each plate when the plates are disposed on the square rod 118.

Figure 8:
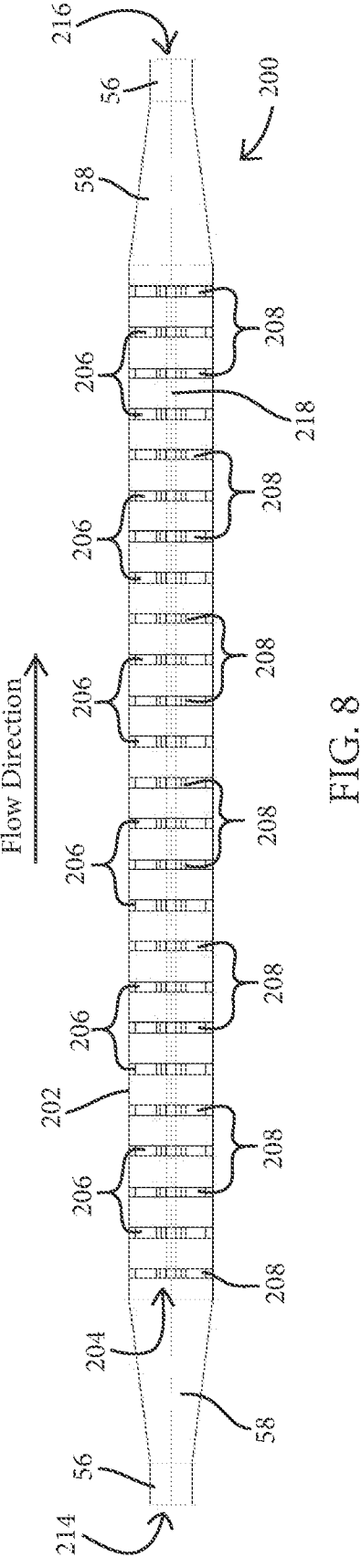
FIG. 8 is a sectional plan view of another water processor in accordance with the present invention.
Figures 9, 9A, 9B:
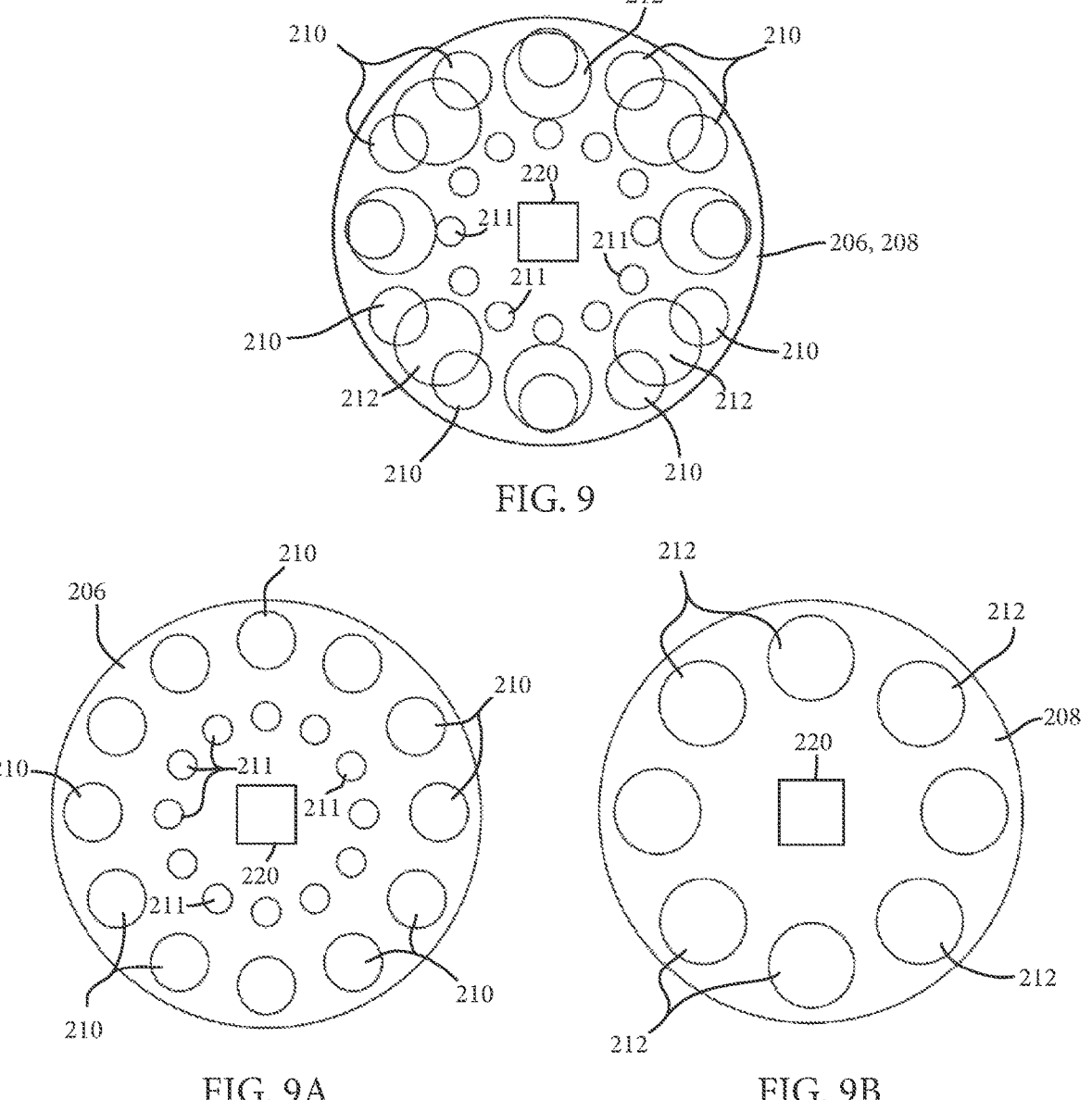
FIG. 9 is a plan view of a water conditioning element of the water processor of FIG. 8, depicting two superimposed conditioning element plates and relative positioning of flow-directing apertures of the respective plates.
FIG. 9A is a plan view of one of the conditioning element plates of FIG. 9.
FIG. 9B is a plan view of the other conditioning element plate of FIG. 9.

Referring now to the illustrative embodiment of FIGS. 8-9B, another water processor 200 is provided for processing or conditioning water passing through a water system. The water processor 200 includes a housing 202 and a water processing or conditioning element 204 disposed inside the housing 202 along the longitudinal axis of the housing 202. The water conditioning element 204 includes a plurality of first water conditioning element plates or discs 206 and a plurality of second water conditioning element plates or discs 208. The plates 206, 208 have different aperture patterns or configurations, wherein the first plate 206 has a first pattern or configuration of apertures, including an outer ring of first apertures 210 and an inner ring of second apertures 211 (FIGS. 9 and 9A) and the second plate 208 has a second pattern or configuration of apertures 212 (FIGS. 9 and 9B) that is different from the first pattern or configuration of apertures 210, 211. The housing 202 includes an inlet 214 at one end and an outlet 216 at the opposite end (FIG. 8). In the illustrated embodiment, the housing 202 is formed of a cylindrical or tubular pipe of fluid transport conduit having an interior diameter of about 1.87 in. The plates 206 and 208 are fixedly disposed in alternating spaced arrangement along an elongate bar or rod 218 (FIG. 8). Each plate 206 and 208 includes a center aperture 220 configured to receive the rod 218 (FIGS. 9-9B).

In one exemplary embodiment, as illustrated in FIGS. 9-9B, the first plate 206 includes a total of twenty-four (24) apertures positioned in an outer ring of twelve (12) uniformly, circumferentially-spaced apertures 210 and an inner ring of twelve (12) uniformly, circumferentially-spaced apertures 211. The second plate 208 includes a total of eight (8) uniformly, circumferentially-spaced apertures 212. The apertures 210 in the outer ring of apertures of first plate 206 each have a diameter of approximately one-quarter inch (0.25 in.), the apertures 211 in the inner ring of apertures of first plate 206 each have a diameter of approximately ⅛ inch (0.125 in.), and the apertures 212 of second plate 208 each have a diameter of approximately ⅜ inch (0.375 in.). The plates 206 and 208 each have a thickness of ¼ inch (0.25 in.) and a diameter of about (1.85 in. which is about the same as or slightly smaller than the inner diameter of the housing 202. The apertures 212 of plate 208 are larger in diameter than apertures 210 and 211 of plate 206 and have different center-to-center spacing as compared to apertures 210 and 211 of first plates 206. Accordingly, as best shown in FIG. 9, when the plates 206 and 208 are disposed in alternating spaced arrangement along the rod 218, the apertures 210 and 211 of first plates 206 are not coaxially aligned with the apertures 212 of second plates 208, thus forming a staggered, circuitous, or substantially indirect flow path along which the water passes through the water processor 200.

In the illustrated embodiment, the first plates 206 and the second plates 208 are each symmetrical about all four quadrants of the circumference of the respective plate (FIGS. 9-9B). As such, the apertures 210 of each first plate 206 are co-axial with the corresponding apertures 210 of the other first plates 206 and the apertures 212 of each second plate 208 are co-axial with the corresponding apertures 212 of the other second plates 208, regardless of the rotational orientation of each plate when the plates are disposed on the square rod 218.

Figures 10, 11:
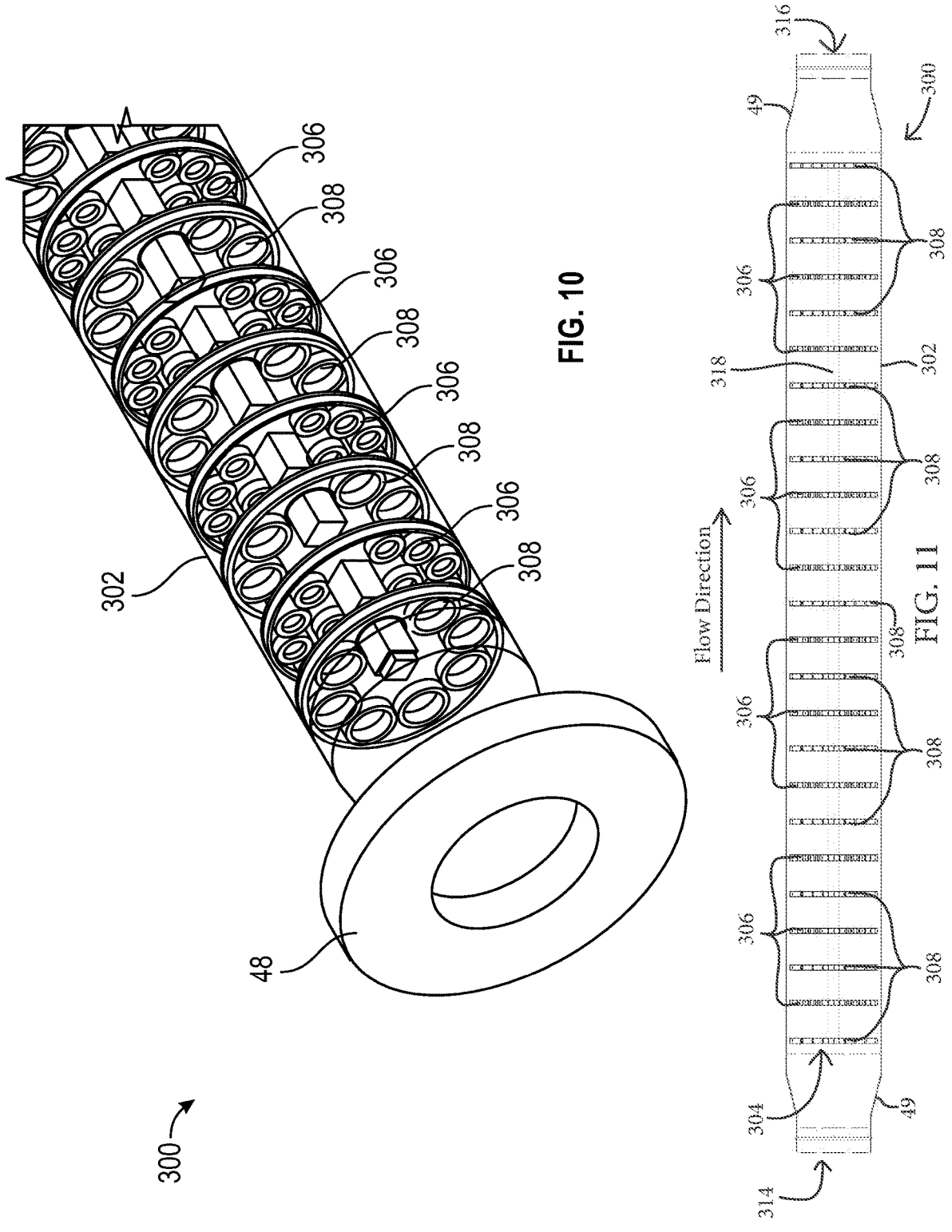
FIG. 10 is a perspective view of a portion of another water processor in accordance with the present invention, the water processor depicted in phantom to show internal structure.
FIG. 11 is a sectional plan view of the water processor of FIG. 10.

Referring now to the illustrative embodiment of FIGS. 10-10B, another water processor 300 is provided for processing or conditioning water passing through a water system. The water processor 300 includes a housing 302 and a water processing or conditioning element 304 disposed inside the housing 302 along the longitudinal axis of the housing 302. The water conditioning element 304 includes a plurality of first water conditioning element plates or discs 306 and a plurality of second water conditioning element plates or discs 308. The plates 306, 308 have different aperture patterns or configurations, wherein the first plate 306 has a first pattern or configuration of apertures 310 (FIGS. 12 and 12A) and the second plate 308 has a second pattern or configuration of apertures 312 (FIGS. 12 and 12B) that is different from the first pattern or configuration of apertures 310. The housing 302 includes an inlet 314 at one end and an outlet 316 at the opposite end (FIG. 11). In the illustrated embodiment, the housing 302 is formed of a cylindrical or tubular pipe of fluid transport conduit having an interior diameter of about 4.26 in. The plates 306 and 308 are fixedly disposed in alternating spaced arrangement along an elongate bar or rod 318 (FIG. 11). Each plate 306 and 308 includes a center aperture 320 configured to receive the rod 318 (FIGS. 12-12B).

In one exemplary embodiment, as illustrated in FIGS. 12-12B, the first plate 306 includes a total of twenty-four (24) apertures 310 positioned in an outer ring of twelve (12) uniformly, circumferentially-spaced apertures 310 and an inner ring of twelve (12) uniformly, circumferentially-spaced apertures 310. The second plate 308 includes a total of eight (8) uniformly, circumferentially-spaced apertures 312. The apertures 310 of first plate 306 each have a diameter of approximately ½ inch (0.5 in.), and the apertures 312 of second plate 308 each have a diameter of approximately one inch (1.0 in.). The plates 306 and 308 each have a thickness of ¼ inch (0.25 in.) and a diameter of about 4³⁄₁₆ inch (4.188 in.), which is about the same as or slightly smaller than the inner diameter of the housing 302. The apertures 312 of plate 308 are larger in diameter than apertures 310 of plate 306 and have different center-to-center spacing as compared to apertures 310 of first plates 306. Accordingly, as best shown in FIG. 12, when the plates 306 and 308 are disposed in alternating spaced arrangement along the rod 318, the apertures 310 of first plates 306 are not coaxially aligned with the apertures 312 of second plates 308, thus forming a staggered, circuitous, or substantially indirect flow path along which the water passes through the water processor 300.

In the illustrated embodiment, the first plates 306 and the second plates 308 are each symmetrical about all four quadrants of the circumference of the respective plate (FIGS. 12-12B). As such, the apertures 310 of each first plate 306 are co-axial with the corresponding apertures 310 of the other first plates 306 and the apertures 312 of each second plate 308 are co-axial with the corresponding apertures 312 of the other second plates 308, regardless of the rotational orientation of each plate when the plates are disposed on the square rod 318.

Figures 13, 14:
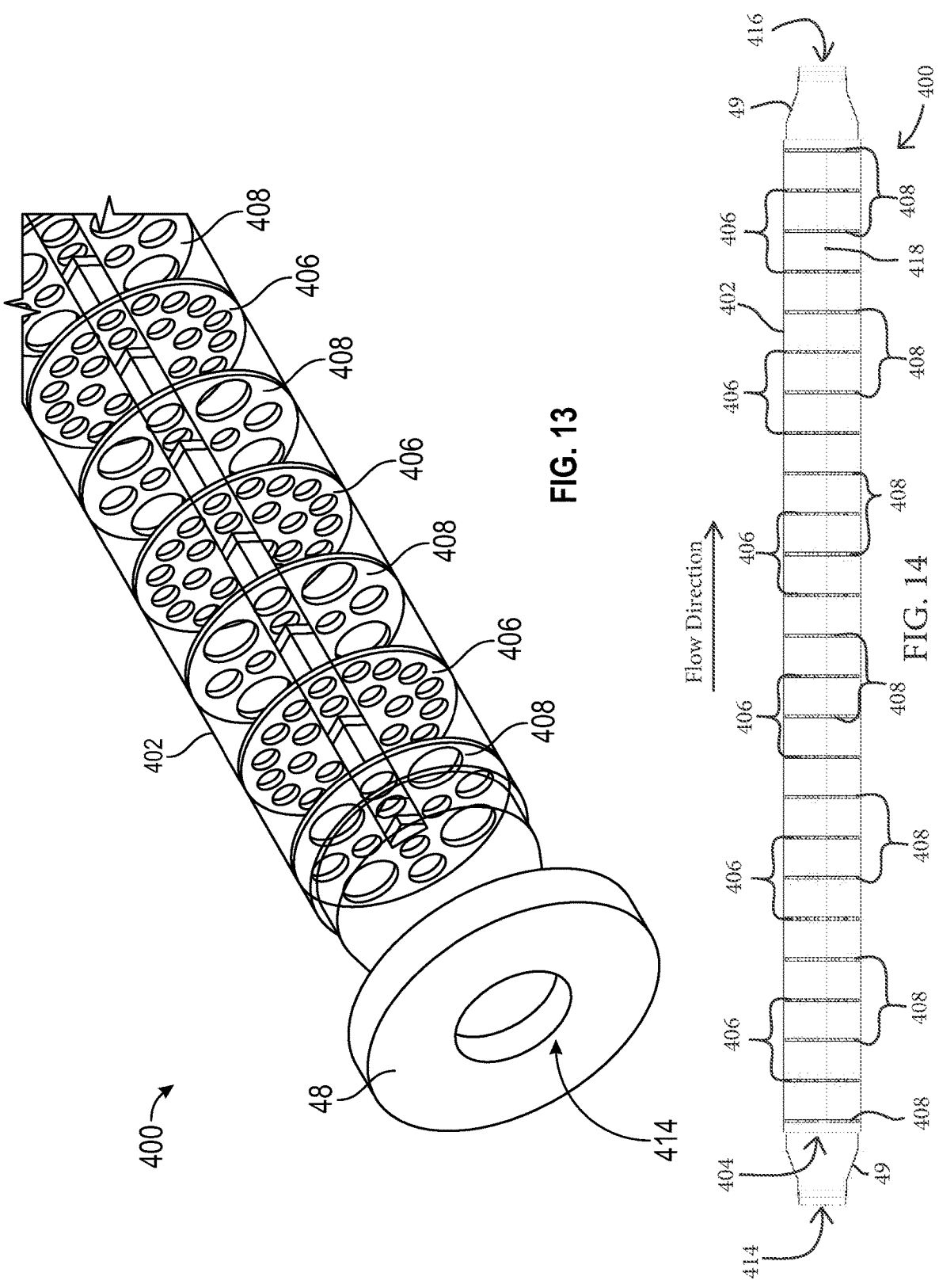
FIG. 13 is a perspective view of a portion of another water processor in accordance with the present invention, the water processor depicted in phantom to show internal structure.
FIG. 14 is a sectional plan view of the water processor of FIG. 13.

Referring now to the illustrative embodiment of FIGS. 13-15B, another water processor 400 is provided for processing or conditioning water passing through a water system. The water processor 400 includes a housing 402 and a water processing or conditioning element 404 disposed inside the housing 402 along the longitudinal axis of the housing 402. The water conditioning element 404 includes a plurality of first water conditioning element plates or discs 406 and a plurality of second water conditioning element plates or discs 408. The plates 406, 408 have different aperture patterns or configurations, wherein the first plate 406 has a first pattern or configuration of apertures 410 (FIGS. 15 and 15A) and the second plate 408 has a second pattern or configuration of apertures, including an outer ring of alternating larger apertures 412 and medium-sized apertures 413 and an inner ring of smaller apertures 415 (FIGS. 15 and 15B) that is different from the first pattern or configuration of apertures 410. The housing 402 includes an inlet 414 at one end and an outlet 416 at the opposite end (FIG. 14). In the illustrated embodiment, the housing 402 is formed of a cylindrical or tubular pipe of fluid transport conduit having an interior diameter of about 6.36 in. The plates 406 and 408 are fixedly disposed in alternating spaced arrangement along an elongate bar or rod 418 (FIG. 14).

Figures 15, 15A, 15B:
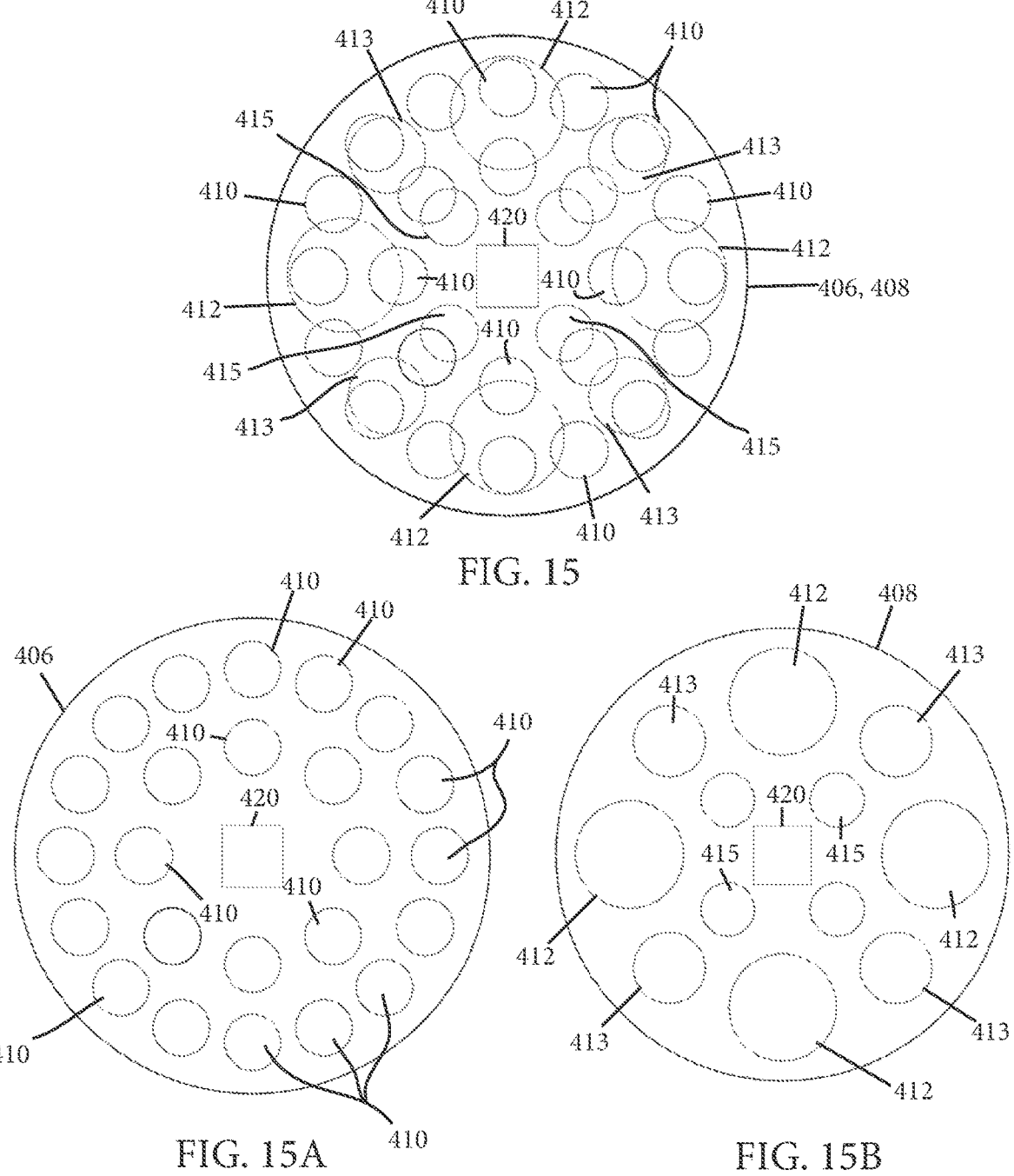
FIG. 15 is a plan view of a water conditioning element of the water processor of FIG. 13, depicting two superimposed conditioning element plates and relative positioning of flow-directing apertures of the respective plates.
FIG. 15A is a plan view of one of the conditioning element plates of FIG. 15.
FIG. 15B is a plan view of the other conditioning element plate of FIG. 15.

Each plate 406 and 408 includes a center aperture 420 configured to receive the rod 418 (FIGS. 15-15B).

In one exemplary embodiment, as illustrated in FIGS. 15-15B, the first plate 406 includes a total of twenty-four (24) apertures 410 positioned in an outer ring of sixteen (16) uniformly, circumferentially-spaced apertures 410 and an inner ring of eight (8) uniformly, circumferentially-spaced apertures 410. The second plate 408 includes a total of twelve (12) apertures positioned in an outer ring of apertures and an inner ring of apertures. The outer ring of apertures of plate 408 includes four (4) larger apertures 412 and four (4) medium sized apertures 413 alternatingly and uniformly circumferentially-spaced with one another. The inner ring of apertures of plate 408 includes four (4) uniformly, circum-ferentially-spaced smaller apertures 415. The apertures 410 of first plate 406 each have a diameter of approximately ¾ inch (0.75 in.). The larger apertures 412 in the outer ring of apertures of second plate 408 each have a diameter of approximately 1½ inches (1.5 in.), the medium-sized aper-tures 413 in the outer ring of apertures of second plate 408 each have a diameter of approximately one inch (1.0 in.), and the smaller apertures 415 in the inner ring of apertures of second plate 408 each have a diameter of approximately ¾ inch (0.75 in.). The plates 406 and 408 each have a thickness of ¼ inch (0.25 in.) and a diameter of about 6.31 in., which is about the same as or slightly smaller than the inner diameter of the housing 402. The apertures 412, 413 in the outer ring of apertures of plate 408 are larger in diameter than apertures 410 of plate 406 and have different center-to-center spacing as compared to apertures 410 of first plates 406. The apertures 415 in the inner ring of apertures of plate 408 have a different center-to-center spacing as compared to apertures 410 of first plates 406. Accordingly, as best shown in FIG. 15, when the plates 406 and 408 are disposed in alternating spaced arrangement along the rod 418, the aper-tures 410 of first plates 406 are not coaxially aligned with the apertures 412, 413, and 415 of second plates 408, thus forming a staggered, circuitous, or substantially indirect flow path along which the water passes through the water processor 400.

In the illustrated embodiment, the first plates 406 and the second plates 408 are each symmetrical about all four quadrants of the circumference of the respective plate (FIGS. 15-15B). As such, the apertures 410 of each first plate 406 are co-axial with the corresponding apertures 410 of the other first plates 406 and the respective apertures 412, 413, and 415 of each second plate 408 are co-axial with the corresponding apertures 412, 413, and 415 of the other second plates 408, regardless of the rotational orientation of each plate when the plates are disposed on the square rod 418.

Figures 16, 17:
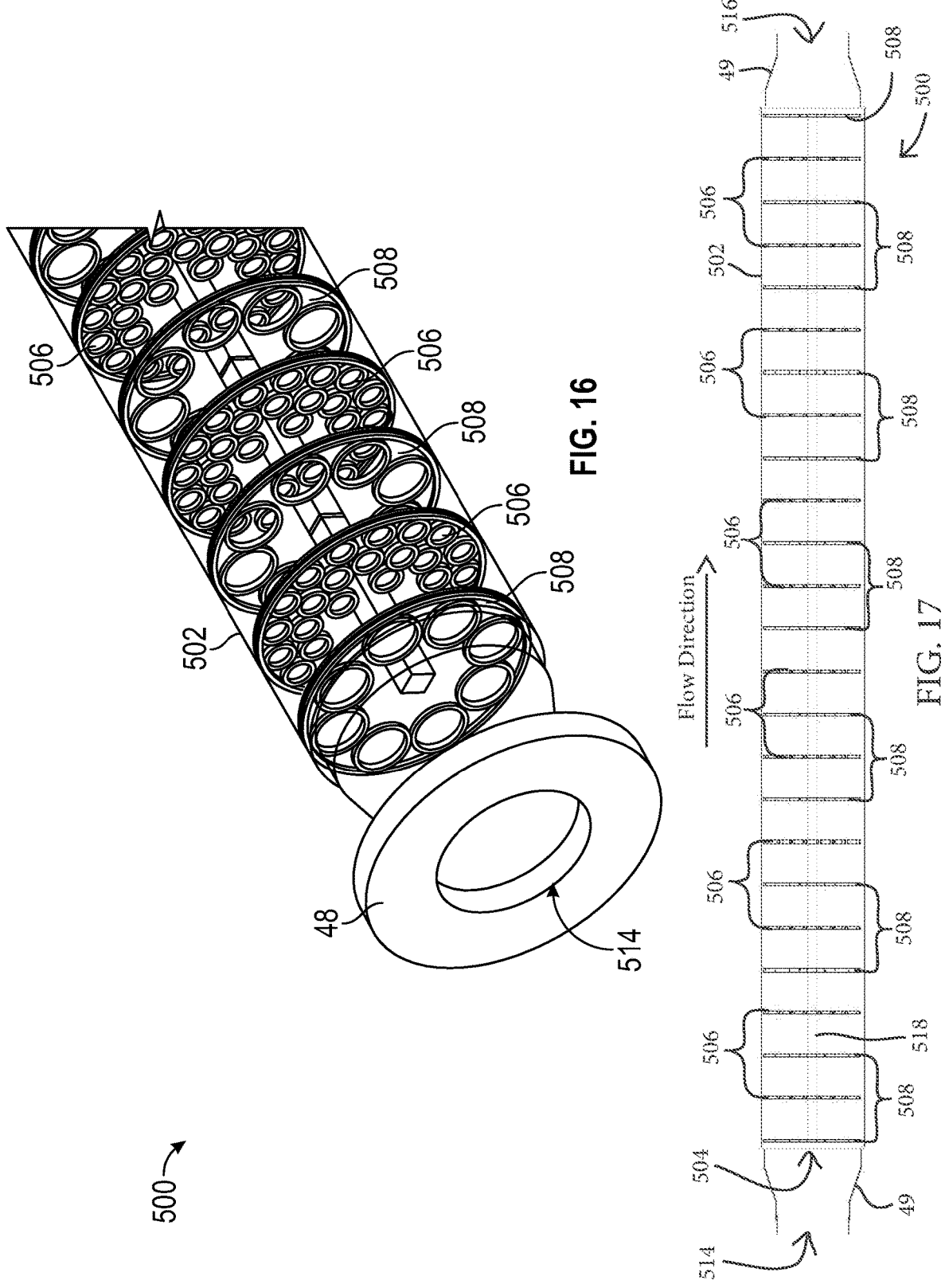
FIG. 16 is a perspective view of a portion of another water processor in accordance with the present invention, the water processor depicted in phantom to show internal structure.
FIG. 17 is a sectional plan view of the water processor of FIG. 16.
Figures 18, 18A, 18B:
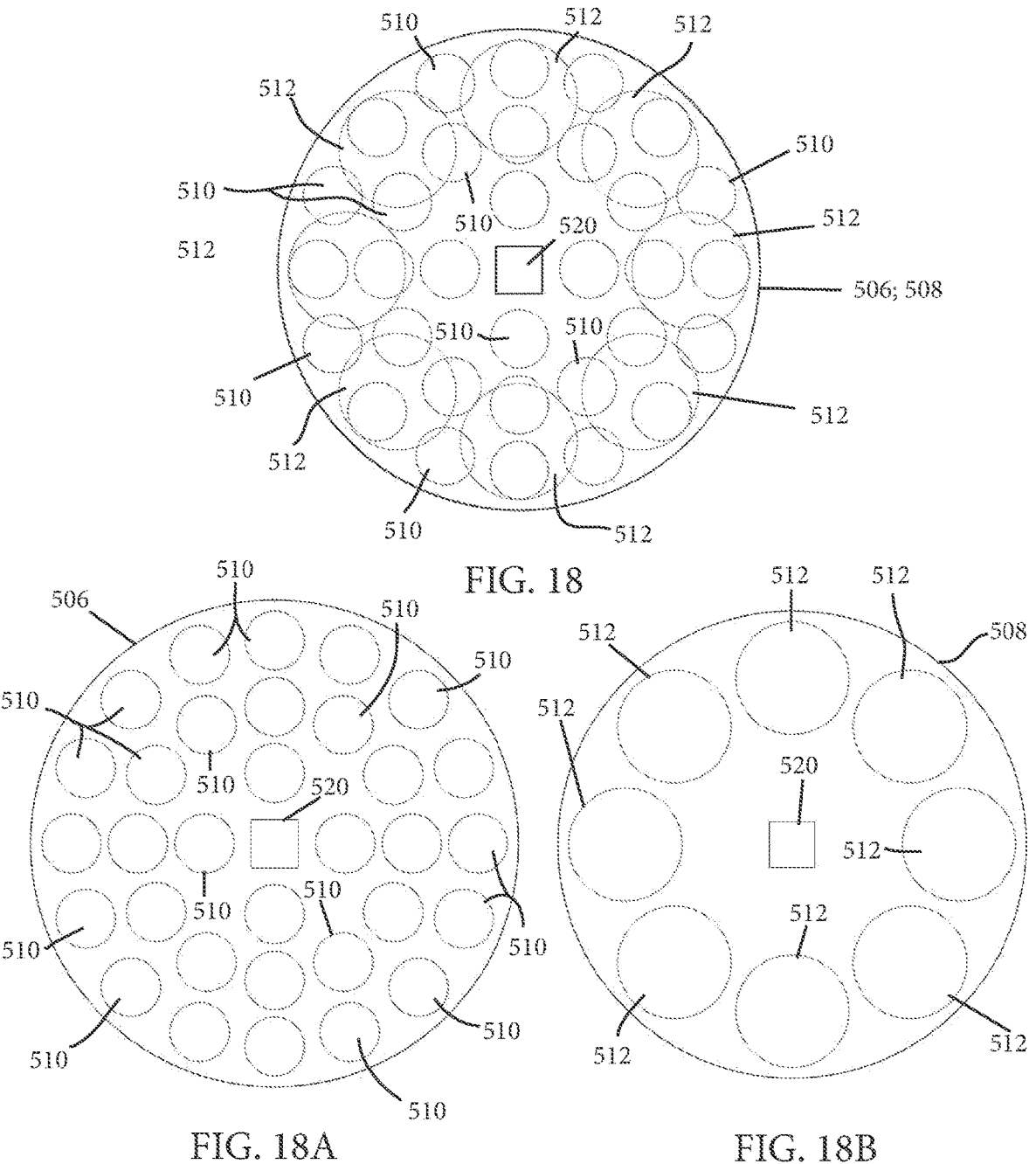
FIG. 18 is a plan view of a water conditioning element of the water processor of FIG. 16, depicting two superimposed conditioning element plates and relative positioning of flow-directing apertures of the respective plates.
FIG. 18A is a plan view of one of the conditioning element plates of FIG. 18.
FIG. 18B is a plan view of the other conditioning element plate of FIG. 18.

Referring now to the illustrative embodiment of FIGS. 16-18B, another water processor 500 is provided for pro-cessing or conditioning water passing through a water system. The water processor 500 includes a housing 502 and a water processing or conditioning element 504 disposed inside the housing 502 along the longitudinal axis of the housing 502. The water conditioning element 504 includes a plurality of first water conditioning element plates or discs 506 and a plurality of second water conditioning element plates or discs 508. The plates 506, 508 have different aperture patterns or configurations, wherein the first plate 506 has a first pattern or configuration of apertures 510 (FIGS. 18 and 18A) and the second plate 508 has a second pattern or configuration of apertures 512 (FIGS. 18 and 18B) that is different from the first pattern or configuration of apertures 510. The housing 502 includes an inlet 514 at one end and an outlet 516 at the opposite end (FIG. 17). In the illustrated embodiment, the housing 502 is formed of a cylindrical or tubular pipe of fluid transport conduit having an interior diameter of about 8.33 in. The plates 506 and 508 are fixedly disposed in alternating spaced arrangement along an elongate bar or rod 518 (FIG. 17). Each plate 506 and 508 includes a center aperture 520 configured to receive the rod 518 (FIGS. 18-18B).

In one exemplary embodiment, as illustrated in FIGS. 18-18B, the first plate 506 includes a total of thirty-two (32) apertures 510 positioned in an outer ring of sixteen (16) uniformly, circumferentially-spaced apertures 510, a middle ring of twelve (12) uniformly, circumferentially-spaced apertures 510, and an inner ring of four (4) uniformly, circumferentially-spaced apertures 510. The second plate 508 includes a total of eight (8) uniformly, circumferen-tially-spaced apertures 512. The apertures 510 of first plate 506 each have a diameter of approximately one inch (1.0 in.), and the apertures 512 of second plate 508 each have a diameter of approximately two inches (2.0 in.). The plates 506 and 508 each have a thickness of ¼ inch (0.25 in.) and a diameter of about 8.26 in., which is about the same as or slightly smaller than the inner diameter of the housing 502. The apertures 512 of plate 508 are larger in diameter than apertures 510 of plate 506 and have different center-to-center spacing as compared to apertures 510 of first plates 506. Accordingly, as best shown in FIG. 18, when the plates 506 and 508 are disposed in alternating spaced arrangement along the rod 518, the apertures 510 of first plates 506 are not coaxially aligned with the apertures 512 of second plates 508, thus forming a staggered, circuitous, or substantially indirect flow path along which the water passes through the water processor 500.

In the illustrated embodiment, the first plates 506 and the second plates 508 are each symmetrical about all four quadrants of the circumference of the respective plate (FIGS. 18-18B). As such, the apertures 510 of each first plate 506 are co-axial with the corresponding apertures 510 of the other first plates 506 and the apertures 512 of each second plate 508 are co-axial with the corresponding aper-tures 512 of the other second plates 508, regardless of the rotational orientation of each plate when the plates are disposed on the square rod 518.

The water processors 10, 100, 200, 300, 400, and 500 of the illustrated embodiments of FIGS. 1-18B may be coupled to upstream and downstream fluid distribution conduits or pipes by various connection types. For example, as shown in the water processor embodiments 10, 300, 400, and 500 illustrated in FIGS. 1 and 10, 13, and 16, a flange or collar 48 and a reducer or tapered portion 49 may be provided at each end of the respective water processor. As illustrated in FIG. 19, the flange 48 of the water processor 10 attaches or mates to a corresponding flange or collar 50 of an upstream pipe 52 or downstream pipe 54. The mated flanges 48 and 50 are secured together, such as with mechanical fasteners or welds, in order to form a watertight connection between the water processor and the upstream and downstream pipes. For another example, as shown in the water processor embodiment 100 of FIG. 5, a pipe fitting 56 and reducer 58 may be provided at each end of the respective water pro-cessor. The pipe fitting 56 attaches or mates to a correspond-ing pipe fitting (or a pipe itself) of an upstream or down-stream pipe. It will be appreciated that the pipe fitting 56 may be one of many known pipe fitting types, such as slip fittings, sweat fittings, compression fittings, male national pipe taper (MNPT) fittings, female national pipe taper (FNPT) fittings, etc.

Referring now to the illustrative embodiment of FIG. 19, the exemplary selectively bypassable branch 600 provides a detailed view of a water processor 10 installed in a water distribution system, such as system 12 shown in FIG. 3. The bypassable branch 600 includes an upstream shutoff valve 36a installed with the upstream pipe 52 and a downstream shutoff valve 36b installed with the downstream pipe 54 to selectively disrupt the flow of water through the branch 600 and to and from the water processor 10. A bypass valve 38 and a bypass water line 40 are provided with the branch 600 to bypass the water processor 10, such as for maintenance of the water processor.

Thus, the water processor provides a staggered, circuitous, or substantially indirect flow path through the water processor, which facilitates sufficient interaction between the water and the conditioning element of the processor. The conditioning element is formed of alternating conditioning element plates or discs. The plates include respective patterns or configurations of flow-directing apertures. Due to the alternating arrangement of the plates and aperture configurations, the water passing through the processor becomes turbulent. The turbulence ensures that the water passing the processor is sufficiently processed by contacting the aperture edges of the plates. The edges of the apertures cut or split suspended gas bubbles into smaller nano-bubbles. The aperture configurations, the aperture edge sharpness, the spacing of the alternating plates, and the dimensions of the water processor can be selected as a function of desired nano-bubble saturation, required water flow rates, and required pressures necessary for the downstream water distribution or processing system.

Changes and modifications in the specifically described embodiments can be carried out without departing from the principles of the present invention which is intended to be limited only by the scope of the appended claims, as interpreted according to the principles of patent law including the doctrine of equivalents.

The invention claimed is:

1. A water processor comprising:
a housing having an inlet and an outlet opposite said inlet;
a conditioning element disposed inside of said housing between said inlet and said outlet, said conditioning element comprising:
a plurality of first flow-directing plates in spaced arrangement, each having an outer diameter that is less than or equal to an internal diameter of said housing, and each defining a plurality of first plate flow-directing apertures arranged in a first configuration; and
a plurality of second flow-directing plates in alternating spaced arrangement with said first plates, each having an outer diameter that is less than or equal to the internal diameter of said housing, and each of said second plates defining a plurality of second plate flow-directing apertures arranged in a second configuration;
wherein a total opening surface area of said plurality of first plate apertures is different than a total opening surface area of said plurality of second plate apertures.

2. The water processor of claim 1, wherein said first configuration of said first plates defines more apertures than said second configuration of said second plates.

3. The water processor of claim 1, wherein said second plate apertures are not co-axial with any of said first plate apertures.

4. The water processor of claim 1, wherein said first and second plates each comprises a circular metal plate having a thickness of between about one-eighth inch (0.125 in.) and one-half inch (0.5 in.) and a spacing between adjacent ones of said first and second plates of between about one-half inch (0.5 in.) and about four inches (4.0 in.).

5. The water processor of claim 1, wherein at least one chosen from said plurality of first plate apertures of each of said first plates and said plurality of second plate apertures of each of said second plates comprises at least two differently sized apertures.

6. The water processor of claim 1, wherein at least one chosen from said plurality of first plate apertures of each of said first plates and said plurality of second plate apertures of each of said second plates comprises two non-contiguous groupings of uniformly spaced apertures, and wherein said groupings of apertures are mirrored across from one another across a diametral axis of each said plate.

7. The water processor of claim 1, wherein said plurality of first plate apertures of each of said first plates comprises an outer ring of twelve apertures arranged contiguously in circumferential spaced arrangement proximate an outer perimeter of each said first plate and an inner ring of four apertures arranged contiguously in circumferential spaced arrangement proximate a center of each said first plate, wherein said plurality of second plate apertures of each of said second plates comprises two non-contiguous groupings of three circumferentially spaced apertures arranged proximate an outer perimeter of each said second plate, and wherein said groupings of three apertures are mirrored across from one another across a diametral axis of each said second plate.

8. The water processor of claim 1, wherein adjacent ones of said first plate apertures have a different center-to-center spacing than adjacent ones of said second plate apertures.

9. The water processor of claim 1, wherein a gap is formed between an outer circumferential edge of each of said plates of said conditioning element and an interior wall of said housing such that some of the water passing through said water processor may pass through said gap and over the outer edge of each of said plates.

10. A water processor comprising:
a housing having an inlet and an outlet opposite said inlet;
a conditioning element disposed inside of said housing between said inlet and said outlet, said conditioning element comprising:
a plurality of flow-directing plates disposed in spaced arrangement inside of said housing, each of said plates comprises a plurality of flow-directing apertures arranged in spaced arrangement, and each of said apertures comprises an edge configuration for splitting larger sized gas bubbles into smaller sized bubbles;
wherein adjacent apertures of one of said plates comprises a different center-to-center spacing than adjacent apertures of an adjacent one of said plates; and
wherein said plates are arranged such that a flow-path through said water processor is circuitous and turbulent.

11. The water processor of claim 10, wherein said plurality of flow-directing plates comprises a plurality of flow-directing first plates and a plurality of flow-directing second plates disposed in alternating spaced arrangement with said first plates, said plurality of flow-directing apertures of said first plates arranged in a first plate configuration and said plurality of flow-directing apertures of said second plates arranged in a second plate configuration, wherein adjacent apertures of said first plate configuration have a different center-to-center spacing than adjacent apertures of said second plate configuration.

12. The water processor of claim 11, wherein at least one chosen from said plurality of apertures of each of said first plates and said plurality of apertures of each of said second plates comprises two non-contiguous groupings of uniformly spaced apertures, and wherein said groupings of apertures are mirrored across from one another across a diametral axis of each said plate.

13. The water processor of claim 11, wherein a total opening surface area of said plurality of apertures of each of said first plates is different than a total opening surface area of said plurality of apertures of each of said second plates.

14. A water processor comprising:

a water conditioning assembly comprising:

an elongate rod;

a plurality of flow-directing circular first plates disposed in spaced arrangement along said rod, each of said first plates comprising:

an outer ring of flow-directing apertures arranged contiguously in circumferential spaced arrangement proximate an outer perimeter of said first plate; and an inner ring of flow-directing apertures arranged contiguously in circumferential spaced arrangement proximate a center of said first plate; and a plurality of flow directing circular second plates disposed along said rod in alternating spaced arrangement with said first plates, each of said second plates comprising:

two non-contiguous groupings of circumferentially spaced flow-directing apertures;

wherein said groupings of apertures are mirrored across from one another across a diametral axis of said second plate;

wherein a water flow passing said water conditioning assembly passes sequentially by each of said first plates and said second plates prior to passing downstream of said water processor; and said water processor configured to split larger sized gas bubbles in a water flow into smaller sized nano-bubbles having a diameter of less than about one micrometer.

15. The water processor of claim 14, wherein a total opening surface area of all of said apertures of each of said first plates is different than a total opening surface area of all of said apertures of each of said second plates.

16. The water processor of claim 14, wherein said water processor is installable within a cylindrical water transport conduit having an inlet end, an outlet end opposite the inlet end, and a middle portion between the inlet end and outlet end, wherein the inlet end, outlet end, and middle portion all have the same inner diameter.

17. The water processor of claim 16, wherein the water transport conduit has an inner diameter between about one inch (1.0 in.) and eight and one-half inches (8.5 in.), wherein each of said first plates and said second plates comprises an exterior diameter of slightly less than the inner diameter of the water transport conduit.

\* \* \* \* \*